United States Patent
Yang

(10) Patent No.: US 10,485,029 B2
(45) Date of Patent: Nov. 19, 2019

(54) SYSTEM AND METHOD FOR COLLISION DETECTION AND MITIGATION WITH WAKE-UP PACKETS

(71) Applicant: Futurewei Technologies, Inc., Plano, TX (US)

(72) Inventor: Yunsong Yang, San Diego, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 3 days.

(21) Appl. No.: 15/907,616

(22) Filed: Feb. 28, 2018

(65) Prior Publication Data

US 2018/0263058 A1 Sep. 13, 2018

Related U.S. Application Data

(60) Provisional application No. 62/468,103, filed on Mar. 7, 2017.

(51) Int. Cl.
*H04W 74/08* (2009.01)
*H04W 52/02* (2009.01)
(Continued)

(52) U.S. Cl.
CPC ........ *H04W 74/0825* (2013.01); *H04L 1/00* (2013.01); *H04W 52/0235* (2013.01); *H04W 74/0816* (2013.01); *H04W 84/12* (2013.01); *Y02D 70/00* (2018.01); *Y02D 70/1262* (2018.01); *Y02D 70/142* (2018.01); *Y02D 70/144* (2018.01);
(Continued)

(58) Field of Classification Search
CPC combination set(s) only.
See application file for complete search history.

(56) References Cited

U.S. PATENT DOCUMENTS

2009/0147837 A1 6/2009 Lau
2016/0112824 A1* 4/2016 Tuset Peiro ...... H04W 72/0446
370/235
2017/0111931 A1* 4/2017 Damnjanovic ... H04W 74/0825

FOREIGN PATENT DOCUMENTS

WO 0160104 A1 8/2001
WO 2016153625 A1 9/2016

OTHER PUBLICATIONS

Park et al., "Low-Power Wake-Up Receiver (LP-WUR) for 802.11," IEEE 802.11-15/1307r1, Minyoung Park, Intel Corporation, Nov. 10, 2015, 18 pages.

(Continued)

*Primary Examiner* — Hicham B Foud
(74) *Attorney, Agent, or Firm* — Slater Matsil, LLP

(57) ABSTRACT

A method for collision detection by a transmission device (TD) includes identifying one or more time periods of a signal generated by the TD. The one or more time periods correspond to periods during which the TD will not transmit energy on a shared channel. The method includes transmitting a subset of the signal. While a current time is within one of the one or more time periods, the transmitting the subset of the signal includes turning off a transmitter of the TD at a beginning of the time period, detecting energy received on the shared channel during a portion of the time period, turning on the transmitter of the TD before an end of the time period, and determining that the detected energy meets a collision threshold. Based on the detected energy meeting the collision threshold, the method includes determining that there is a transmission collision.

27 Claims, 10 Drawing Sheets

(51) Int. Cl.
 *H04L 1/00* (2006.01)
 *H04W 84/12* (2009.01)
(52) U.S. Cl.
 CPC ............ *Y02D 70/162* (2018.01); *Y02D 70/22*
  (2018.01); *Y02D 70/23* (2018.01); *Y02D 70/26*
  (2018.01)

(56) References Cited

OTHER PUBLICATIONS

Park et al., "LP-WUR (Low-Power Wake-Up Receiver): Enabling Low-Power and Low-Latency Capability for 802.11," IEEE 802.11-16/0027r0, Minyoung Park, Intel Corporation, Jan. 18, 2016, 21 pages.
Park, et al., "LP-WUR (Low-Power Wake-Up Receiver) Follow-Up," IEEE 802.11-16/0341r0, Minyoung Park, Intel Corporation, Mar. 14, 2016, 9 pages.

\* cited by examiner

SYSTEM AND METHOD FOR COLLISION DETECTION AND MITIGATION WITH WAKE-UP PACKETS

This application claims the benefit of U.S. Provisional Application No. 62/468,103, filed on Mar. 7, 2017, entitled "System and Method for Collision Detection and Mitigation with Wake-Up Packets," which application is hereby incorporated herein by reference in its entirety.

TECHNICAL FIELD

The present disclosure relates generally to a system and method for digital communications, and, in particular embodiments, to a system and method for collision detection and mitigation with wake-up packets.

BACKGROUND

Power consumption is a key consideration in devices that are battery powered. A design criterion for a battery powered device is to minimize power consumption to extend the period of time between battery recharges or replacement as much as possible. In some deployments, such as remotely located sensors, battery replacement may be both impractical as well as expensive. Even in situations where the battery powered device is readily available and recharging is easy, such as in cellular telephones, tablets, laptop computers, wearable devices (WDs), and so on, recharging the battery is still an inconvenient and time consuming task.

Radio communications modules (RCMs), which provide wireless connectivity that is so vital to the operation of these battery powered devices, is also a significant source of power consumption. In general, the more complex the communications and/or greater range supported by the RCM, the greater the power consumption. A reduction in power consumption is realizable by putting one or more RCMs of a battery powered device into sleep (or power off) mode when there is no need of data communications while maintaining a simple, low-power wake-up receiver to receive a wake-up packet. The wake-up packet is transmitted by another device to wake up at least one of the one or more RCMs of the battery powered device in order to resume data communications with the battery powered device. The Institute of Electrical and Electronics Engineers (IEEE) 802.11 Working Group has initiated a standard amendment project referred to as the 802.11ba Amendment to standardize such wake-up technique to be added to the 802.11 family of standards.

However, in a communications system (such as an 802.11-compliant communications system) utilizing contention based mechanisms for accessing a shared communications medium, collisions between transmissions simultaneously attempted by different communications devices in the communications system may occur. In some cases, a collision probability as high as 10% may be targeted in order to improve the communications medium utilization, because targeting a smaller collision probability requires the competing devices to choose their random back-off time within a larger contention window. However, increasing the contention window size would decrease the communications medium utilization, because the back-off time chosen by the device wining the contention tends to increase with the contention window size and the communications medium isn't occupied until the back-off time of the wining device expires. Therefore, the collision probability in a contention based communications system typically isn't negligible and there is a need for systems and methods for detecting transmission collisions and for mitigating the impact of the transmission collisions.

SUMMARY

Example embodiments provide a system and method for detecting a collision with a wake-up packet and for mitigating the impact of such detected collision.

In accordance with an example embodiment, a method for collision detection by a transmission device (TD) is provided. The method includes identifying, by the TD, one or more time periods of a signal generated by the TD, the one or more time periods corresponding to periods during which the TD will not transmit energy on a shared channel, and transmitting, by the TD, a subset of the signal, wherein while a current time is within one of the one or more time periods, transmitting the subset of the signal comprises, turning off, by the TD, a transmitter of the TD at a beginning of the time period, detecting, by the TD, energy received on the shared channel during a portion of the time period, turning on, by the TD, the transmitter of the TD before an end of the time period, and determining, by the TD, that the detected energy meets a collision threshold, and based thereon, determining that there is a transmission collision.

Optionally, in any of the preceding embodiments, an embodiment wherein the signal is an On-off-keying (OOK) modulated signal.

Optionally, in any of the preceding embodiments, an embodiment wherein the signal is used for waking up a communications station from a sleep mode.

Optionally, in any of the preceding embodiments, an embodiment wherein the signal is a wake-up radio beacon.

Optionally, in any of the preceding embodiments, an embodiment wherein the TD is an access point (AP).

Optionally, in any of the preceding embodiments, an embodiment further comprising stopping, by the TD, the transmitting the signal when the detected energy meets the collision threshold.

Optionally, in any of the preceding embodiments, an embodiment further comprising retransmitting, by the TD, the signal at a later time in response to determining that the detected energy meets the collision threshold.

Optionally, in any of the preceding embodiments, an embodiment wherein each time period corresponds to an information bit "0" immediately followed by an information bit "1".

Optionally, in any of the preceding embodiments, an embodiment wherein each time period corresponds to encoded bits "0 0", and wherein each encoded bit "0" of the encoded bits "0 0" is modulated as an "off" symbol, for which the TD does not transmit energy on the shared channel.

Optionally, in any of the preceding embodiments, an embodiment further comprising obtaining, by the TD, an information related to a distance between the TD and a receiving device (RD), wherein the RD is an intended recipient of the signal.

Optionally, in any of the preceding embodiments, an embodiment wherein the information related to the distance is one of a physical distance between the TD and the RD or a signal path-loss between the TD and the RD.

Optionally, in any of the preceding embodiments, an embodiment wherein the collision threshold is determined in accordance with a function of the information related to the distance.

Optionally, in any of the preceding embodiments, an embodiment wherein determining that there is a transmission collision further comprises determining, by the TD, that the information related to the distance is less than a distance threshold.

Optionally, in any of the preceding embodiments, an embodiment further comprising: turning on, by the TD, a receiver of the TD to perform the detecting after turning off the transmitter; and turning off, by the TD, the receiver before turning the transmitter back on.

Optionally, in any of the preceding embodiments, an embodiment wherein each of the one or more time periods is of sufficient duration allowing sufficient time for the TD to perform all of the following within the time period: turning off the transmitter, turning on the receiver, detecting energy received on the shared channel during a subset of the time period using the receiver, turning off the receiver, and turning on the transmitter.

Optionally, in any of the preceding embodiments, an embodiment further comprising averaging, by the TD, the energy detected during each time period, wherein determining the transmission collision is in accordance with the averaged detected energy and the collision threshold.

In accordance with an example embodiment, a TD adapted to perform collision detection is provided. The transmitting device includes one or more processors, and a computer readable storage medium storing programming for execution by the one or more processors. The programming including instructions to configure the transmitting device to identify one or more time periods of a signal generated by the TD, the one or more time periods corresponding to periods during which the TD will not transmit energy on a shared channel, and transmit a subset of the signal, wherein while a current time is within one of the one or more time periods, transmitting the subset of the signal comprises, turn off a transmitter of the TD at a beginning of the time period, detect energy received on the shared channel during a portion of the time period, turn on the transmitter of the TD before an end of the time period, and determine that the detected energy meets a collision threshold, and based thereon, determine that there is a transmission collision.

Optionally, in any of the preceding embodiments, an embodiment wherein the one or more processors further execute the instructions to stop a transmission of the signal when the detected energy meets the collision threshold.

Optionally, in any of the preceding embodiments, an embodiment wherein the one or more processors further execute the instructions to retransmit the signal at a later time in response to determining that the detected energy meets the collision threshold.

Optionally, in any of the preceding embodiments, an embodiment wherein the one or more processors further execute the instructions to obtain an information related to a distance between the TD and a RD, wherein the RD is an intended recipient of the signal.

Optionally, in any of the preceding embodiments, an embodiment wherein the one or more processors further execute the instructions to one of determine the collision threshold in accordance with a function of the information related to the distance or determine that the information related to the distance is less than a distance threshold.

Optionally, in any of the preceding embodiments, an embodiment wherein the one or more processors further execute the instructions to turn on a receiver of the TD to perform the detecting of the energy after turning off the transmitter, and turn off the receiver before turning the transmitter back on.

Optionally, in any of the preceding embodiments, an embodiment wherein the one or more processors further execute the instructions to average the energy detected during each time period, wherein the transmission collision is determined in accordance with the averaged detected energy and the collision threshold.

In accordance with an example embodiment, a method for collision detection by a TD is provided. The method includes identifying, by the TD, a time period of an On-off-keying (OOK) modulated signal generated by the TD, the time period corresponding to a period during which the TD will not transmit energy on a shared channel, transmitting, by the TD, the OOK modulated signal over the shared channel prior to the time period, turning off, by the TD, a transmitter of the TD at a beginning of the time period, detecting, by the TD, energy received on the shared channel during a portion of the time period, and determining, by the TD, that the detected energy meets a collision threshold, and based thereon, determining that the OOK modulated signal experienced a transmission collision.

Optionally, in any of the preceding embodiments, an embodiment further comprising stopping, by the TD, the transmitting the OOK modulated signal when the detected energy meets the collision threshold.

Optionally, in any of the preceding embodiments, an embodiment further comprising retransmitting, by the TD, the OOK modulated signal at a later time in response to determining that the detected energy meets the collision threshold.

Optionally, in any of the preceding embodiments, an embodiment further comprising turning on, by the TD, a receiver of the TD to perform the detecting after turning off the transmitter.

In accordance with an example embodiment, a method for a TD detecting a malicious interference associated with a replay attack is provided. The method includes transmitting, by the TD, a first signal comprising a first sequence of on symbols and off symbols, each on symbol being represented with energy being transmitted onto a channel and each off symbol being represented with a lack of energy being transmitted onto the channel, detecting, by the TD, a first energy received on the channel during consecutive off symbols of the first sequence of the on symbols and the off symbols, determining, by the TD, that there is a collision with the first signal when the detected first energy meets a collision threshold, transmitting, by the TD, a second signal comprising a second sequence of the on symbols and the off symbols, detecting, by the TD, a second energy received on the channel during consecutive off symbols of the second sequence of the on symbols and the off symbols, determining, by the TD, that there is a collision with the second signal when the detected second energy meets the collision threshold, and based thereon determining, by the TD, that the malicious interference associated with the replay attack is detected.

Optionally, in any of the preceding embodiments, an embodiment wherein the first signal is a first wake-up radio (WUR) Beacon including a timestamp of the TD and wherein the second signal is a second WUR Beacon including an updated timestamp of the TD.

Optionally, in any of the preceding embodiments, an embodiment further comprising changing, by the TD, a mode of WUR operations to a secured mode, the secured mode operating without WUR Beacons.

Optionally, in any of the preceding embodiments, an embodiment wherein the secured mode is an always-on mode, wherein the always-on mode is a mode in accordance with which the TD wakes up an RD by transmitting a wake-up packet at any time, wherein the RD is an intended recipient of the wake-up packet.

Optionally, in any of the preceding embodiments, an embodiment wherein the secured mode is an asynchronous duty-cycled mode, wherein the asynchronous duty-cycled mode is a mode in accordance with which the TD is unable to determine beginnings or endings of On periods, during which a WUR receiver of an RD is active, in accordance with a clock of the TD, and based thereon, wakes up the RD by transmitting a specified number of the wake-up packets, the transmission meeting an interval criteria.

Practice of the foregoing embodiments enables the detecting of a collision of a signal transmitted by a transmitting device with another signal transmitted by another device. The detecting of the collision by the transmitting device occurs before the transmitting device finishes transmitting the signal. The detecting of the collision of the signal by the transmitting device does not require adding overhead in the signal by utilizing the modulation symbol periods (within the signal) corresponding to absence of energy being transmitted on the channel.

Practice of the foregoing embodiments enables the mitigating of a collision of a signal transmitted by a transmitting device with another signal transmitted by another device. For example, the transmitting device may stop transmitting a remainder of the signal as soon as the collision is detected so as to stop interfering with the other signal. For another example, the transmitting device may initiate a re-transmission of the signal as soon as the channel becomes idle and a back-off period of the transmitting device expires, wherein the back-off period is much shorter than a time-out period, wherein the time-out period would otherwise be required for detecting the collision without using the techniques described herein.

Practice of the foregoing embodiments enables the detecting of interference to a WUR Beacon and a subsequent replacement WUR Beacon, both transmitted by a transmitting device. The detecting of the persistent interference by the transmitting device occurs while the transmitting device is transmitting the WUR Beacons by utilizing the modulation symbol periods (within each of the WUR Beacons) corresponding to absence of energy being transmitted on the channel and meeting a duration requirement. The detecting of the persistent interference to WUR Beacons transmitted by the transmitting device enables the transmitting device to detect a malicious interference associated with a replay attack aiming to compromise time synchronization between the transmitting device and a receiving device, and based thereon, to enter a secured mode of operations for waking up the receiving device, wherein the secured mode of operations operates without the WUR Beacons.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
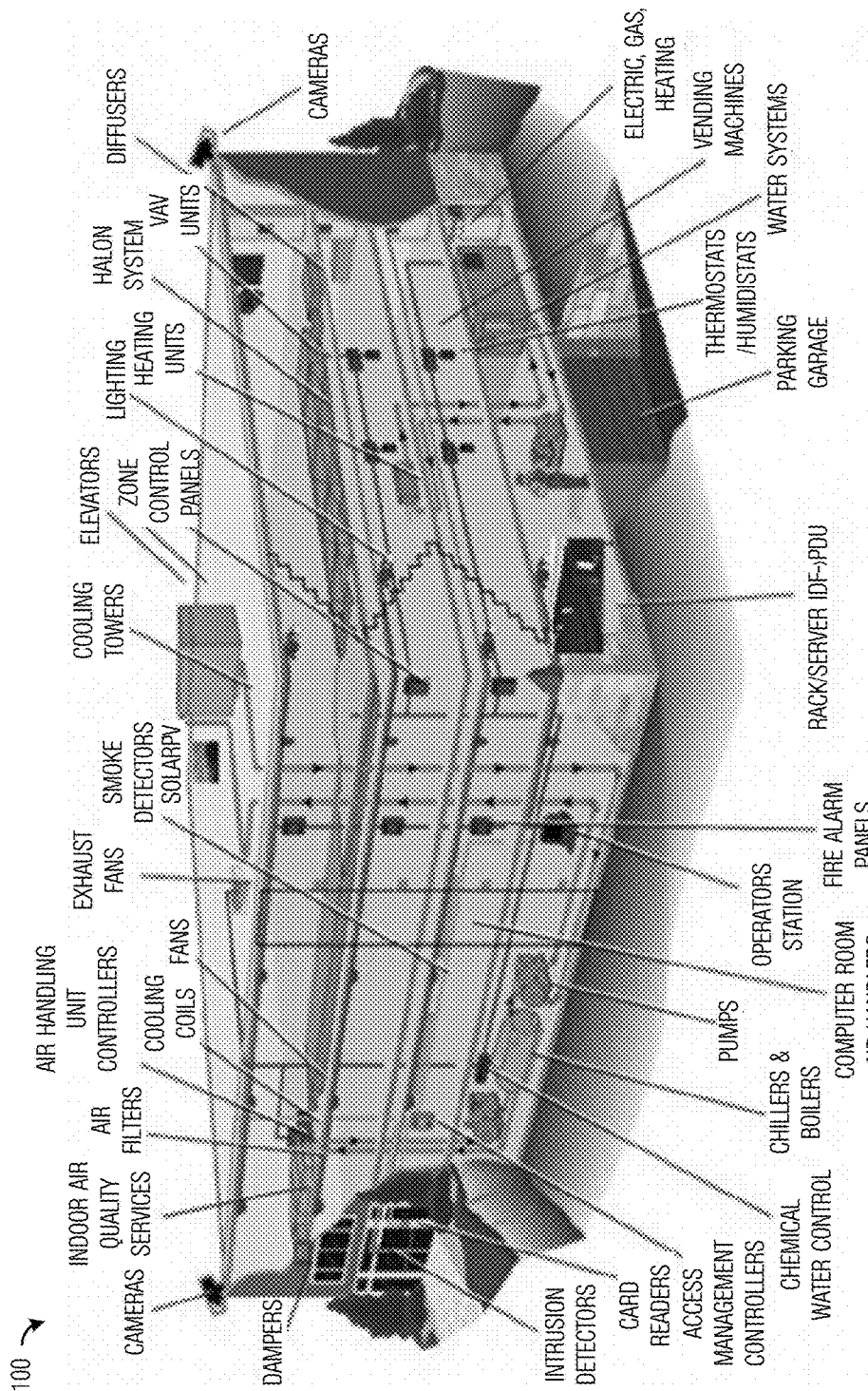
FIG. 1 illustrates an example smart building highlighting various sensors and monitoring devices.

The Internet of Things (IoT) is a suite of technologies and applications that enable devices and locations to generate all kinds of information—and to connect those devices and locations for instant data analysis and, ideally, "smart" actions. For example, the IoT promises to facilitate smart buildings by uniting a variety of sensors and facility equipments into an integrated whole. FIG. 1 illustrates an example smart building 100 highlighting various sensors and monitoring devices, which are deployed in or around a commercial or residential building to monitor various conditions such as lighting, temperature, air quality, fire, smoke, carbon monoxide (CO) gas, security, intrusion, etc., and various facility equipments such as lighting equipments, heating or cooling equipments, air ventilation equipments, fire alarms, sprinkling system, security alarms, information systems, etc., which are deployed to control the various fore-mentioned conditions in order to provide a healthy, comfort, and safe environment for people in the building and to do so in an energy-efficient manner. The various sensors and monitoring devices communicate with the various facility equipments, either directly or via a communications and control center, by using data communications technologies. For example, one or more data access points may be deployed throughout a smart building, where the data access points are connected to a center of communications, data analysis, and control, typically via wired connections such as cables. The data access points are also connected to the various sensors and monitoring devices, as well as communications modules on the various facility equipments, typically via radio communications (such as Wi-Fi, BlueTooth, and ZigBee), so that the various sensors and equipments may be deployed anywhere in the building at a later time without the need to alter the previous cable-wiring. Many of these sensors and the communications modules operate on battery power.

The IEEE Standard 802.11-2016 is a set of media access control (MAC) layer and physical (PHY) layer specifications for implementing wireless local area network (LAN) or wireless fidelity (Wi-Fi) communications in the 2.4, 5, and 60 GHz frequency bands. A basic service set (BSS) provides the basic building-block of an 802.11 wireless LAN. In an infrastructure mode of 802.11, a single access point (AP) together with all associated stations (STAs) form a BSS. The AP acts as a master to control the STAs within that BSS. A station (STA) may also be referred to as a device, a user equipment, a terminal, a node, and so forth. An AP may also be referred to as a network controller, a base station, a wireless router (due to a router co-located with the AP, the router providing a connection to a network), and so on. The simplest infrastructure BSS consists of one AP and one STA.

Figure 2:
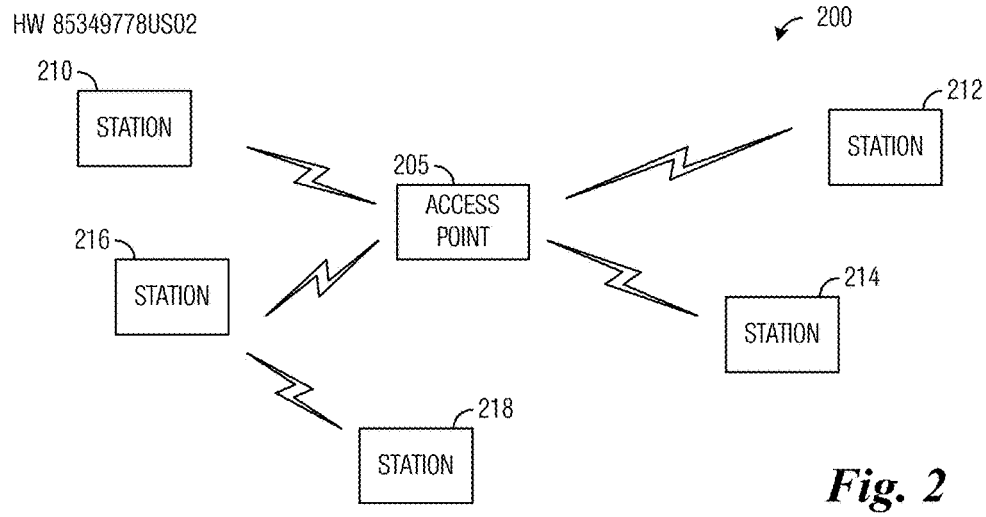
FIG. 2 illustrates an example communications system comprising IEEE 802.11 components.

FIG. 2 shows an example communications system 200 consisting of an infrastructure BSS. Communications system 200 includes an access point (AP) 205 that is serving a plurality of stations, such as stations 210, 212, 214, 216, and 218. Access point 205 controls certain aspects (such as radio frequency channel, transmission power limit, authentication, security, etc.) of communications with or among its associated stations. Generally speaking, in communications system 200, wireless resources for both uplink (station to access point) and downlink (access point to station) transmissions are accessed by transmitters based on a distributed contention mechanism commonly referred to as carrier sensing multiple access with collision avoidance (CSMA/CA). However, access point 205 still may influence the resource allocation by assigning different access priorities to stations and/or traffic types, and when succeeding in channel contention, by explicitly allocating certain time periods for certain stations and/or traffics or for special purposes, such as Quiet Period during which time no transmitter may transmit.

Figure 3:
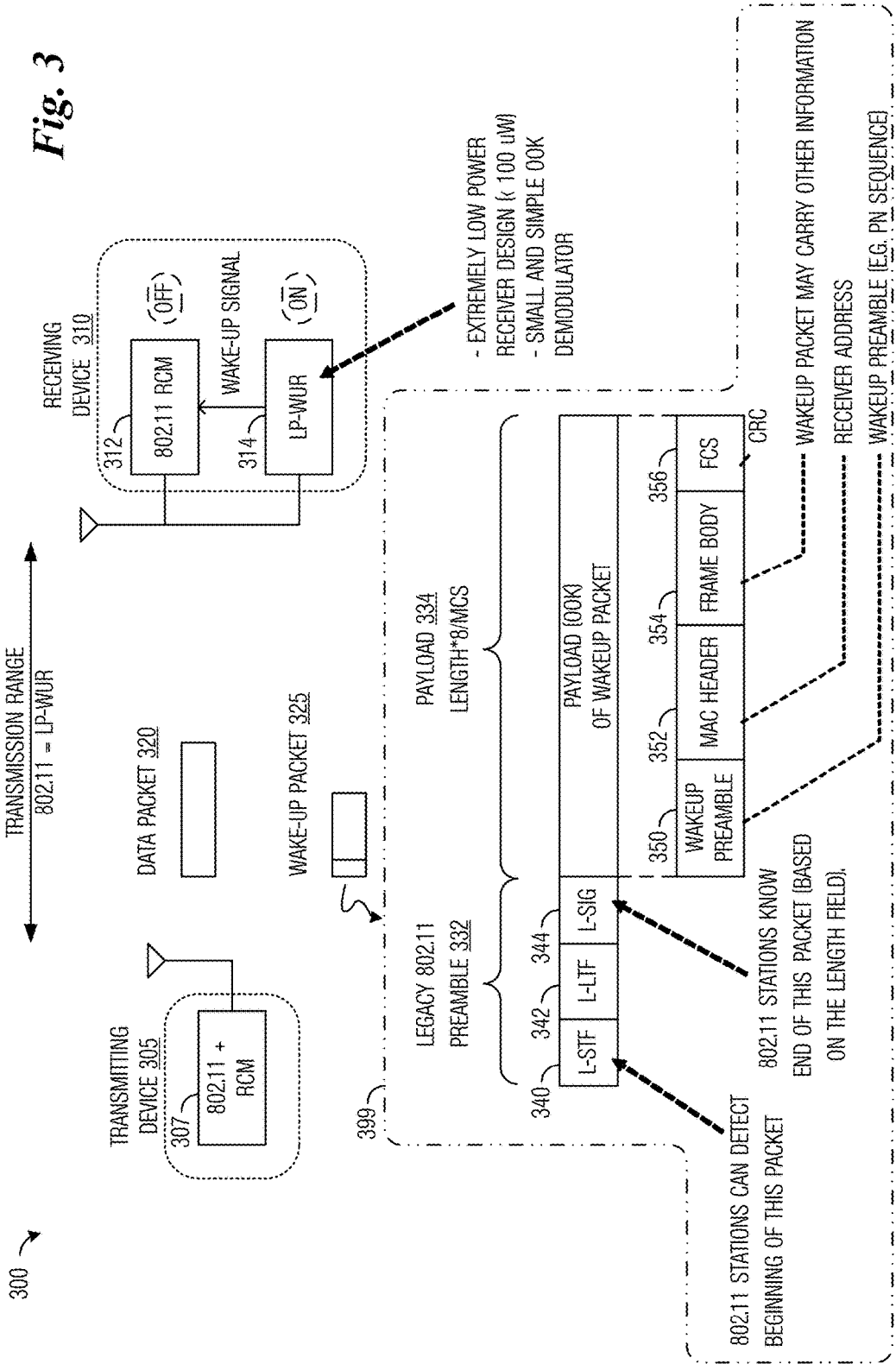
FIG. 3 illustrates an example IEEE 802.11 communications system with a low-power wake-up radio according to example embodiments described herein.

FIG. 3 illustrates an example IEEE 802.11 communications system 300 with a low-power wake-up radio (LP-WUR). Communications system 300 includes a transmitting device 305 and a receiving device 310. Examples of transmitting device 305 may include an AP attempting to wake up a sleeping STA associated with the AP, a STA attempting to wake up a sleeping AP serving the STA, and a STA operating in a peer-to-peer (P2P) communications mode and attempting to wake up a peer STA that is sleeping. Examples of receiving device 310 may include a sleeping STA served by an AP, a sleeping AP, and a sleeping STA operating in the P2P communications mode. The terms transmitting device and receiving device are used herein to reflect the roles that the devices play, respectively, with regards to the transmission or reception of narrow-band signals, which are described herein as the wake-up packet and the WUR Beacon. These terms should not be construed as a limitation of these devices with regards to their overall capability of transmitting and receiving signals as a communications device. As the following description will show, both the transmitting device and the receiving device are capable of transmitting and receiving wide-band signals using their respective RCM. Transmitting device 305 includes, among other things, an enhanced 802.11 RCM (labelled "802.11+") 307. Enhanced 802.11 RCM 307 is capable of communications utilizing IEEE 802.11 standard signaling, as well as LP-WUR signaling, including the transmission of a wake-up packet. At least a payload portion of the wake-up packet may be transmitted over a much narrower channel bandwidth than the IEEE 802.11 standard signaling. For example, IEEE 802.11 standard signaling may be transmitted over a channel bandwidth of 20 MHz and the payload of the wake-up packet may be transmitted over a channel bandwidth of 5 MHz or less. A narrower bandwidth helps to reduce the cost and power consumption of an intended receiver, such as one in receiving device 310, which is very desirable for designing a LP-WUR. It is noted that in some places the term WUR refers to the wake-up radio technique as a whole, which comprises a wake-up packet, a first device transmitting the wake-up packet, a receiver of a second device receiving the wake-up packet, and the use of the wake-up packet to wake up an RCM of the second device from a sleep mode. In some other places, WUR just narrowly refers to the receiver of the second device that is configured to receive the wake-up packet. As related to the discussion presented herein, when discussing the wake-up receiver and not the wake-up radio technique as a whole, a special note is made or the word "receiver" is added to WUR.

Receiving device 310 includes, among other things, an 802.11 RCM 312 and a LP-WUR 314, wherein LP-WUR 314 comprises a wake-up receiver of receiving device 310. 802.11 RCM 312 is intended for communicating user data while LP-WUR 314 is not. Thus, LP-WUR 314 usually does not have a transmitter. LP-WUR 314 is present to assist in waking up 802.11 RCM 312 from a sleeping or OFF mode. In general, LP-WUR 314 is ON when 802.11 RCM 312 is OFF (e.g., in the sleeping mode). LP-WUR 314 comprises a memory (or register) designed to store a value provided by a processor associated with 802.11 RCM 312, a receiver designed to receive at least the payload of the wake-up packet, and a comparator designed to compare a value in the received payload with the value stored in the memory. The comparator generates a signal referred to as a wake-up interrupt when the received value matches with the stored value. LP-WUR 314 is coupled to 802.11 RCM 312 through a connection used for carrying the wake-up interrupt, which may be used by LP-WUR 314 to wake up 802.11 RCM 312 from the sleeping mode.

In computer science, an interrupt is a term used for a signal external to a processor that alerts the processor to a high-priority condition or event requiring the interruption of the current program the processor is executing. The processor responds by suspending its current activities and executing programs to deal with the event. The interruption may be temporary, and, after the execution of programs dealing with the event finishes, the processor may resume its current activities. For example, when there is no data communications for a while or when a sleep command is received, a processor associated with 802.11 RCM 312 may execute a program that places at least a major portion of the electronic circuits inside 802.11 RCM 312 into a sleeping mode, which may also be referred to as a power save mode or a power off mode. While the portion of the electronic circuits of 802.11 RCM 312 is in the sleeping mode, the capabilities of 802.11 RCM 312 is disabled to the extent that 802.11 RCM 312 is no longer capable of communications utilizing IEEE 802.11 standard signaling. The processor associated with 802.11 RCM 312 responds to the wake-up interrupt generated by LP-WUR 314 by powering up the electronic circuits inside 802.11 RCM 312 thereby resuming its capability to communicate utilizing IEEE 802.11 standard signaling. In general, when in the ON or active state, 802.11 RCM 312 will consume significantly greater power than LP-WUR 314, at least one or two orders of magnitude more power. An example target power consumption for LP-WUR 314 is less than 100 micro-watts while ON. The receiver of LP-WUR 314 has a narrow radio frequency (RF) bandwidth matching the bandwidth of the payload of the wake-up packet, 5 MHz or less than, for example, and has a reception range that is approximately equal to that of 802.11 RCMs.

When performing 802.11 communications, transmitting device 305 transmits data packets, such as data packet 320, to receiving device 310, where 802.11 RCM 312 receives and processes the data packet.

As shown in FIG. 3, receiving device 310 initially is in a reduced power state. One of the ways that receiving device 310 is able to reduce power consumption is to turn OFF 802.11 RCM 312 while keeping LP-WUR 314 ON. When receiving device 310 is in the reduced power state, 802.11 RCM 312 is OFF and receiving device 310 is unable to receive or process 802.11 data packets.

However, LP-WUR 314 remains ON and receiving device 310 is able to receive wake-up packets, such as wake-up packet 325. The wake-up packet may also be referred to as a wake-up frame, a WUR frame, a wake-up physical protocol data unit (PPDU), or a WUR PPDU. In a situation where transmitting device 305 has data to transmit to receiving device 310, but receiving device 310 is in the reduced power state, transmitting device 305 first transmits wake-up packet 325 to receiving device 310, e.g., using 802.11+ RCM 307. Wake-up packet 325 is received and processed by LP-WUR 314, which wakes up 802.11 RCM 312. Then, transmitting device 305 transmits data to receiving device 310 using 802.11+ RCM 307 and receiving device 310 receives the data using 802.11 RCM 312.

A highlight 399 provides a detailed view of an example wake-up packet, e.g., wake-up packet 325. The wake-up packet includes a preamble 332 and a payload 334. Preamble 332 is compliant to 802.11 technical standards and includes a Legacy short training field (L-STF) 340, a Legacy long training field (L-LTF) 342, and a Legacy SIGNAL field (L-SIG) 344. Payload 334 includes multiple fields, including a wake-up preamble 350, a medium access control (MAC) header (e.g., comprising a receiver MAC address or a WUR identifier (WUID) used for identifying the intended recipient) 352, a frame body 354, and a frame check sequence (FCS) 356. Wake-up preamble 350 contains a wake-up sequence. The wake-up sequence may be a pseudo-random number sequence, for example, possessing good auto-correlation properties, or simply a sequence of alternating "1010 . . . " bits, for another example, in order to assist LP-WUR receivers to acquire timing for sampling and detecting the remainder of payload 334. MAC header 352 contains an address or identifier (such as WUID) of a receiving device that wake-up packet 325 is intended to wake up. Frame body 354 may contain other information.

FCS 356 includes a cyclic-redundancy check (CRC) for integrity checking wake-up packet 325. In order to maintain compatibility with 802.11 compliant devices in communications system 300, preamble 332 is an 802.11 legacy preamble transmitted over a channel bandwidth complaint with 802.11 standard signaling, such as 20 MHz.

Preamble 332 is not to be detected by the LP-WUR receivers, such as LP-WUR 314, because the receiver bandwidth of LP-WUR is usually insufficient to receive 802.11 legacy preambles, such as preamble 332. Instead, preamble 332 is intended for legacy 802.11 devices to prevent them from transmitting during the transmission of payload 334. A LENGTH subfield of L-SIG 344 in preamble 332 is used to convey information regarding the duration of payload 334. Payload 334 includes information that is modulated using a simple modulation scheme, such as On-Off-Keying (OOK) and is transmitting over a narrower channel bandwidth, such as 5 MHz or less. Therefore, legacy 802.11 devices normally won't be able to detect information (except for the energy) carried in payload 334. However, legacy 802.11 devices are capable of detecting preamble 332 because preamble 332 fully complies with the bandwidth and signal format of legacy 802.11 standards. Thus, when receiving preamble 332, legacy 802.11 devices will recognize that the channel will be busy for at least a duration conveyed by the LENGTH value and thereafter suspend their attempts of transmitting during the transmission of payload 334, as if payload 334 complied with IEEE 802.11 standard signaling. It is noted that despite of the placement and the use of preamble 332 to protect payload 334, collision with wake-up packet 325 may still happen when both transmitting device 305 and an interfering device declare wining the channel contention at the same time, because there are a finite number of back-off time values within the contention window, from which transmitting device 305 and the interfering device can randomly choose as their back-off times, respectively.

The OOK modulation may be implemented using an orthogonal frequency division multiplexing (OFDM) transmitter with relatively minor modification, wherein an "On" symbol is generating by the OFDM transmitter by placing signal energy on selected subcarriers (which is also referred to as tones), such as the subcarriers corresponding to the center 5 MHz frequency band of a 20 MHz channel, performing inverse fast Fourier transform (IFFT) to produce an IFFT symbol, and inserting a cyclic prefix to the IFFT symbol to produce an OFDM symbol, while an "Off" symbol may be generated by placing no energy on any subcarriers, performing the IFFT, and inserting the cyclic prefix (which simply results in a null OFDM symbol), or simply by being silent (i.e., absence of energy being transmitted on the channel) for the duration of the OFDM symbol corresponding to the "Off" symbol. For example, enhanced 802.11 RCM 307 is not only capable of OFDM modulated communications but also capable of transmitting wake-up packets by generating OFDM symbols corresponding to the "On" symbols and "Off" symbols as described above.

Figure 4A:
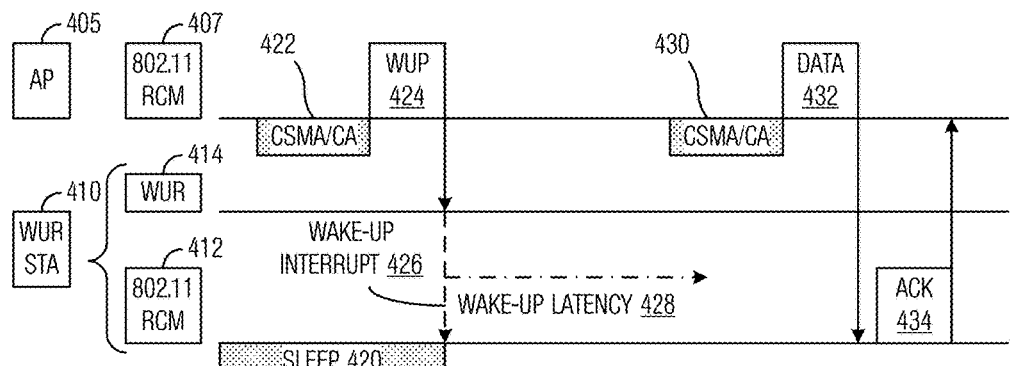
FIG. 4A illustrates an example sequence of events for waking up a communications station to receive a short transmission.

FIG. 4A illustrates an example sequence of events, wherein a transmitting device 405 wakes up a receiving device 410 in order to transmit a short data to receiving device 410. Transmitting device 405 includes, among other things, an enhanced 802.11 RCM 407. Enhanced 802.11 RCM 407 is capable of communications utilizing IEEE 802.11 standard signaling, as well as transmitting of a wake-up packet (e.g., wake-up packet 325). It is noted that wake-up packet is abbreviated WUP in the figures. Receiving device 410 includes, among other things, an 802.11 RCM 412 and a WUR receiver 414. As shown in FIG. 4A, 802.11 RCM 412 is initially placed in a sleep mode (shown as shaded block 420). 802.11 RCM 407 initiates a CSMA/CA based channel contention procedure (shown as shaded block 422). 802.11 RCM 407 wins the channel contention and transmits the wake-up packet (shown as WUP 424 in FIG. 4A). WUR receiver 414 receives the wake-up packet and wakes up 802.11 RCM 412 with a wake-up interrupt signal 426. Then, it takes a period of time (shown as wake-up latency 428) for the electronics circuits in 802.11 RCM 412 to be powered up and become ready for transmitting and receiving conventional 802.11 signals. 802.11 RCM 407 initiates a second CSMA/CA based channel contention procedure (shown as shaded block 430). 802.11 RCM 407 wins the second channel contention and transmits data to 802.11 RCM 412 (shown as data 432). 802.11 RCM 412 transmits an acknowledgement (ACK) frame back after receiving the data correctly (shown as ACK 434). The data exchange may continue until all data have been transmitted and received. Then, 802.11 RCM 412 may be placed back into the sleep mode.

Figure 4B:
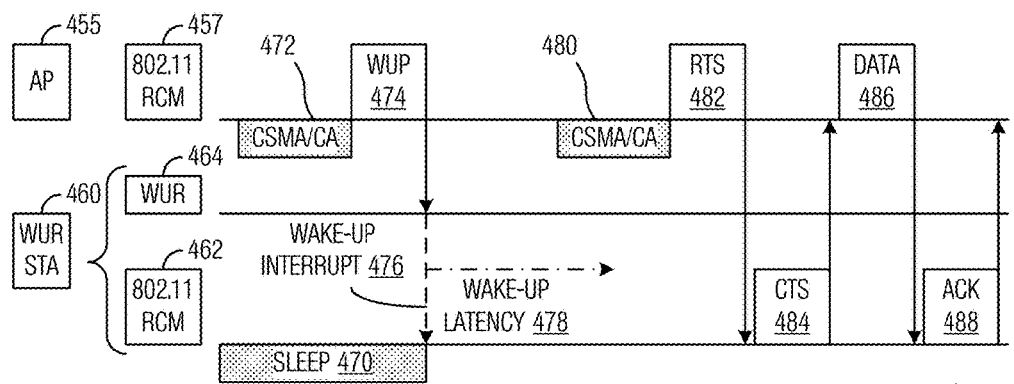
FIG. 4B illustrates an example sequence of events for waking up a communications station to receive a long transmission.

FIG. 4B illustrates an example sequence of events, wherein a transmitting device 455 wakes up a receiving device 460 in order to transmit a long data to receiving device 460. Transmitting device 455 includes, among other things, an enhanced 802.11 RCM 457. Enhanced 802.11 RCM 457 is capable of communications utilizing IEEE 802.11 standard signaling, as well as transmitting of a wake-up packet (e.g., wake-up packet 325). Receiving device 460 includes, among other things, an 802.11 RCM 462 and a WUR receiver 464. As shown in FIG. 4B, 802.11 RCM 462 is initially placed in a sleep mode (shown as shaded block 470). 802.11 RCM 457 initiates a CSMA/CA based channel contention procedure (shown as shaded block 472). 802.11 RCM 457 wins the channel contention and transmits the wake-up packet (shown as WUP 474). WUR receiver 464 receives the wake-up packet and wakes up 802.11 RCM 462 with a wake-up interrupt signal 476. Then, it takes a period of time (shown as wake-up latency 478) for the electronics circuits in 802.11 RCM 462 to be powered up and become ready for transmitting and receiving conventional 802.11 signals. 802.11 RCM 457 initiates a second CSMA/CA based channel contention procedure (shown as shaded block 480). 802.11 RCM 457 wins the second channel contention and transmits a request-to-send (RTS) frame 482 to 802.11 RCM 462. 802.11 RCM 462 transmits a clear-to-send (CTS) frame 484 back after receiving the RTS frame correctly and determining that the request (to send a pending data) can be met. 802.11 RCM 457 transmits data 486 to 802.11 RCM 462. 802.11 RCM 462 transmits an ACK frame 488 back after receiving the data correctly. The data exchange may continue until all data have been transmitted and received. Then, 802.11 RCM 462 may be placed back into the sleep mode.

As shown in FIGS. 4A and 4B, receiving devices 410 and 460 are able to reduce their power consumption by placing their 802.11 RCMs 412 and 462, respectively, into sleep mode when there is no need for data communications. However, there is a prolonged delay in delivering a data to receiving device 410 or receiving device 460 while they are sleeping, due to the addition of a wake-up operation that includes performing a channel contention procedure to gain access to the channel (e.g., as shown in shaded blocks 422 and 472), transmitting a wake-up packet (e.g., as shown in WUPs 424 and 474), and waiting for a wake-up latency to expire (e.g., as shown in wake-up latencies 428 and 478). If the wake-up packet is not detected by WUR receiver 414 (in WUP 424) or WUR receiver 464 (in WUP 474), for example, due to a collision with another transmission, transmitting device 405 or transmitting device 455 won't be able to detect the collision until transmitting device 405 fails to receive the ACK frame 434 or transmitting device 455 fails to receive the CTS frame 484, upon which time transmitting device 405 or transmitting device 455 may have to initiate the transmission of another wake-up packet to receiving device 410 or receiving device 460, to repeat processing and/or communications corresponding to reference numerals 422-434 or reference numerals 472-484, respectively. Therefore, the already prolonged delay in delivering the data to the sleeping device may be further amplified due to a loss of the wake-up packet. Such extended delays in delivering data may prevent the WUR technology from being adopted in devices that are used for delay-sensitive applications. Therefore, systems and methods for detecting collisions with wake-up packets as soon as possible and for mitigating the impact of such detected collisions are needed.

Figure 5:
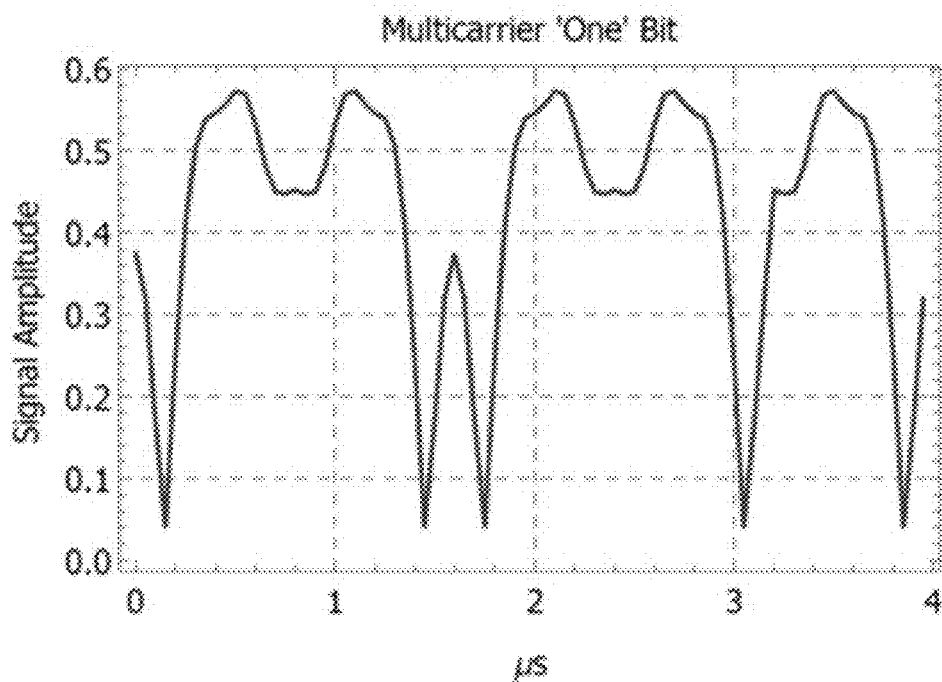
FIG. 5 illustrates a time domain waveform of an "On" symbol (corresponding to a logic "1" bit) that is generated by using an OFDM (multicarrier) transmitter.

As described before, the payload (such as payload 334) of the wake-up packet (such wake-up packet 325) is transmitted using On-Off-Keying (OOK) modulation, where a logic "1" bit may be transmitted as an "On" symbol (during which period there is energy being transmitted on the channel) and a logic "0" bit may be transmitted as an "Off" symbol (during which period there is absence of energy being transmitted on the channel). An "On" symbol may be transmitted as a rectangular pulse using a time domain OOK transmitter. Alternatively, an "On" symbol can be transmitted as a time domain waveform of an OFDM symbol that is generated by using an OFDM transmitter, which is also referred to as a multicarrier transmitter, with the following steps: 1) placing energy on the selected subcarriers (such as subcarriers corresponding to the center 5 MHz of the 20 MHz channel, as described before) in frequency domain; 2) perform IFFT to produce an IFFT symbol; and 3) add a cyclic prefix (CP) to the IFFT symbol by copying a last portion of the IFFT symbol and concatenating it to the beginning of the IFFT symbol to produce an OFDM symbol. FIG. 5 illustrates the time domain waveform of an "On" symbol (corresponding to a logic "1" bit) that is generated by using an OFDM (multicarrier) transmitter. Meanwhile, an "Off" symbol may be transmitted as placing no energy onto the channel during an entire OFDM symbol period. According to the nomenclature of IEEE 802.11 standards, an OFDM symbol is 4 microsecond long. Therefore, both an "On" symbol and an "Off" symbol is 4 microsecond long in duration.

According to a first embodiment of the present invention, a transmitting device (such as transmitting device 305 in FIG. 3) may first generate information bits for a wake-up packet (such as wake-up packet 325) to be transmitted. The information bits may include information bits for a wake-up preamble (such as preamble 332), a wake-up payload (such as payload 334), or a combination thereof. The transmitting device may encode and modulate the information bits to generate the OOK symbols, e.g., by using the multicarrier modulator as described before. The transmitting device may use a pattern searcher to search for a pattern within the wake-up packet that leads to one or more consecutive instances of the "Off" symbol, during which period the transmitting device doesn't need to transmit energy onto the channel.

The pattern searcher may search for the pattern at a bit level or the OOK symbol level. If searching at the bit level, the searched pattern may be a bit "0". It is noted that a bit "1" may be the searched pattern if the bit "1" is mapped into an "Off" symbol. If searching at the OOK symbol level, the searched pattern may simply be the "Off" symbol. The transmitting device may begin to sequentially transmit the OOK symbols within the wake-up packet. While transmitting the "On" symbols within the wake-up packet sequentially, during a period corresponding to one or more consecutive "Off" symbols identified by the pattern searcher, the transmitting device may turn off its transmitter, which is a part of the RCM of the transmitting device (such as enhanced RCM 307), and turn on its receiver, which is another part of the RCM of the transmitting device, to detect whether there is simultaneous transmission also occurring during the transmission of the wake-up packet, thereby resulting in a collision with the wake-up packet.

The receiver may perform a clear channel assessment (CCA) procedure as defined in the IEEE 802.11 standards to determine whether there is a simultaneous transmission. The receiver may detect the energy received on the channel to determine whether there is a simultaneous transmission, for example. The receiver may detect the energy received on the specific subcarriers that are used for carrying energy for the "On" symbol (as described before) to determine whether there is a simultaneous transmission, as another example. The transmitting device turns its receiver off and its transmitter back on before the beginning of a subsequent "On" symbol. It is noted that turning a transmitter (or a receiver) on or off may comprise turning on or shutting down related electronic circuits of the transmitter (or the receiver), respectively. In an embodiment, turning the transmitter (or the receiver) may comprise switching an output of the transmitter (or an input to the receiver) on or off, respectively, with respect to an antenna that is time-wise shared (i.e., time division duplexed) between the transmitter and the receiver of the transmitting device. An example component performing the switching for a single shared antenna is a single pole double throw (SPDT) switch. An example component performing the switching for a pair of shared antennas is a double pole double throw (DPDT) switch. Therefore, switching an output of the transmitter (or an input to the receiver) off an antenna means disconnecting or decoupling the output of the transmitter (or the input to the receiver) from the antenna, and switching an output of the transmitter (or an input to the receiver) on an antenna means connecting or coupling the output of the transmitter (or the input to the receiver) to the antenna.

However, a single and non-consecutive "Off" symbol, which is carried over one 802.11 OFDM symbol, is only 4 microseconds long, which may not meet a duration requirement with state of the art hardware implementations. The duration requirement requires the period, as identified by the pattern searcher for detecting a collision with the wake-up packet, to be of adequate duration to ensure that the transmitting device has sufficient time to complete all of the following steps:

1) turning the transmitter off at a beginning of the period;
2) turning the receiver on to detect for a simultaneous transmission for a specified time period; and
3) turning the receiver off and turning the transmitter back on before an end of the period to get ready for transmitting the next "On" OOK symbol.

In some state of the art electronics today, it may take about 2 microseconds to switch a transmitter off and another 2 microseconds to switch it back on, leaving insufficient time to perform step 2) in order to obtain reliable detection, if the period corresponds to only a single and non-consecutive "Off" symbol. Therefore, in some state of the art hardware implementations, the pattern searcher in the first embodiment may enforce the aforementioned duration requirement by further restricting its searched pattern to two or more consecutive "Off" symbols. Alternatively, the pattern searcher in the first embodiment may further restrict its searched pattern to two or more consecutive "0" bits that are mapped to two or more consecutive "Off" symbols. Similarly, if a bit "1" is mapped to an "Off" symbol, the pattern searcher in the first embodiment may further restrict its searched pattern to two or more consecutive "1" bits. Thus any single and non-consecutive "Off" symbol period may not be utilized for collision detection. By not considering these single and non-consecutive "Off" symbols, the requirements for hardware implementations can be eased. Nevertheless, future hardware implementations may allow for the use of a single and non-consecutive "Off" symbol period for collision detection if the transmitter (as well as the receiver) allows for faster on-off and off-on transition times.

However, the information bits in a wake-up packet are generated in such a manner that it may not always be able to find two or more consecutive "0" bits or "Off" symbols in every wake-up packet. Thus, according to a second embodiment of the present invention, a means to generate a period or periods of consecutive "Off" symbols without changing the multicarrier modulator or the nomenclature, as defined in IEEE standards 802.11-2016, is provided. In one example, Manchester coding technique is used. Manchester code is a baseband line code where each information bit is encoded as either a transition from level low to level high or a transition from level high to level low, with equal duration for level low and level high. Historically, there are two conventions specifying the mapping between binary information bits and these two transitions. The first convention was initially published by G. E. Thomas in 1949 and is hereby referred to herein as the Thomas convention.

Figure 6:
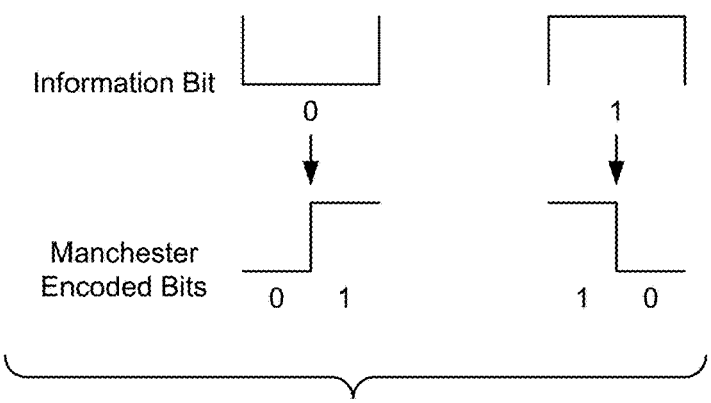
FIG. 6 illustrates an example Manchester code used for encoding a wake-up packet according to example embodiments described herein.

FIG. 6 illustrates the mapping in accordance with the Thomas convention. As shown in FIG. 6, an information bit "0" is encoded as a transition from level low (represented as an encode bit "0" in FIG. 6) to level high (represented as an encode bit "1" in FIG. 6) and an information bit "1" is encoded as a transition from level high to level low. A second convention of Manchester code was introduced later, where the mapping is exactly the opposite (of the Thomas convention), i.e., an information bit "0" is encoded a transition from level high to level low and an information bit "1" is encoded a transition from level low to level high. The second convention was adopted in the IEEE 802.4 (Token Bus) standard and the low speed versions of the IEEE 802.3 (Ethernet) standard, thus is hereby referred to herein as the IEEE convention. The example embodiments presented herein are operable with either convention. For the sake of illustration, the Thomas convention will be used to describe the example embodiments disclosed herein. Therefore, the focus on the Thomas convention of Manchester coding should not be construed as being limiting to either the scope or the spirit of the example embodiments.

According to the second embodiment of the present invention, a transmitting device (such as transmitting device 305 in FIG. 3) may first generate information bits for a wake-up packet (such as wake-up packet 325) to be transmitted. The information bits may include information bits for a wake-up preamble (such as preamble 332), a wake-up payload (such as payload 334), or a combination thereof. The transmitting device may encode each information bit into 2 encoded bits using Manchester code, e.g., in accordance with the Thomas convention, wherein an information bit "0" is encoded as an encoded bit "0" followed by an encoded bit "1", and an information bit "1" is encoded as an encoded bit "1" followed by an encoded bit "0".

Figure 7:
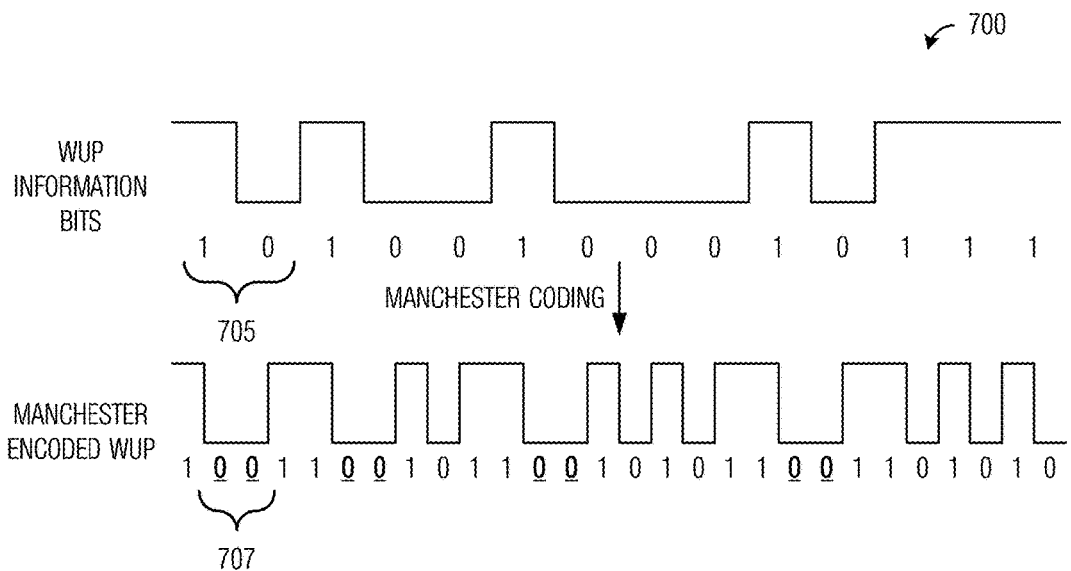
FIG. 7 illustrates an example wake-up packet encoded by using Manchester code highlighting four instances of two consecutive "Off" symbols according to example embodiments described herein.

FIG. 7 illustrates a diagram 700 of an example wake-up packet encoded by using Manchester code with the Thomas convention. Then, each encoded bit is modulated into an OOK symbol and transmitted. For example, each encoded bit "1" is modulated and transmitted as an "On" symbol and each encoded bit "0" is modulated and transmitted as an "Off" symbol. Therefore, whenever there is an information bit "1" immediately followed by an information bit "0", e.g., such as information bits 705, these two information bits will be encoded as encoded bits "1001" and be modulated and transmitted as one "On" symbol followed by two consecutive "Off" symbols and one "On" symbol. In FIG. 7, four instances of two consecutive "0 0" encoded bits, such as encoded bits 707, (shown in the Manchester-encoded wake-up packet (WUP)) are underlined to highlight the two consecutive "Off" symbols that each instance will be converted into according to the second example embodiments described herein.

The two consecutive "Off" symbols produce a period of 8 microseconds (according to the nomenclature of the IEEE Standards 802.11-2016). As estimated in the discussion of the first embodiment, steps 1) and 3) may take a total of 4 microseconds, thus leaving about 4 microseconds for step 2) if the period of the two consecutive "Off" symbols (8 microseconds) is used for collision detection. Therefore, in the second embodiment, the transmitting device utilizes one or more instances of the two consecutive "Off" symbols, which are generated by encoding the information bits with Manchester code for example, to detect for a simultaneous transmission (which would result in a collision with the wake-up packet), because the two consecutive "Off" symbols meet the duration requirement, as described above, with state of the art hardware implementations today. In the second embodiment, the transmitting device doesn't need to utilize those single and non-consecutive "Off" symbols to detect for a simultaneous transmission. Therefore, the second embodiment eases the requirements for hardware implementations.

In the second embodiment, the transmitting device may also use a pattern searcher to search for a pattern within the wake-up packet in order to identify one or more instances of the two consecutive "Off" symbols. The pattern searcher may search for the pattern at the information bit level, the encoded bit level, or the OOK symbol level. If searching at the information bit level, the searched pattern, in accordance with the Thomas convention, may be an information bit "1" immediately followed by an information bit "0" or simply information bits "10". The searched pattern may be the information bits "01" if the Manchester code with the IEEE convention is used (or if the opposite OOK symbol mapping, i.e., an encoded bit "1" is mapped into an "Off" symbol, is used). If searching at the encoded bit level, the searched pattern may be the encoded bits "1001" or simply the encoded bits "00". The searched pattern may be the encoded bits "11" if the opposite OOK symbol mapping (i.e., an encoded bit "1" is mapped into an "Off" symbol) is used. If searching at the OOK symbol level, the searched pattern may simply be the two consecutive "Off" symbols. Manchester code (with either convention) has been used as example means to generate a period or periods of two consecutive "Off" symbols without changing the multicarrier modulator or the nomenclature, as defined in IEEE standards 802.11-2016.

However, other means are also possible, such as using a spreading code (Walsh code, for an example) to spread the information bits, or using a repetition scheme to repeat the information bits, the encoded bits, or the OOK symbols, in order to create two or more consecutive "Off" symbols. However, producing an excessive number of consecutive "Off" symbols is not desirable, because other devices wishing to transmit may consider the excessive period of absence of energy received on the channel as if the channel is idle, and they may start to transmit, causing collision or interference with the on-going transmission of the wake-up packet. As an illustrative example, an "Off" period of 8 to 12 microseconds (corresponding to 2 to 3 OFDM symbols) is a good duration range with period being sufficiently long to enable the transmitting device to perform the detection of a simultaneous transmission while keeping the period sufficiently short so that other devices wishing to transmit will be unable to misinterpret the channel as being idle. The use of the Manchester code also affords other benefits, such as, improving the detection performance of the OOK modulated wake-up packet and enabling a receiving device to recover a clock signal from the Manchester encoded sequence received. Therefore, it may be advantageous to use the Manchester code to obtain a period or periods of two consecutive "Off" symbols to enable the transmitting device to detect for a simultaneous transmission before the transmitting device finishes transmitting the wake-up packet.

In both the first and the second embodiments as described above, during one or more instances of the "Off" symbol or the two consecutive "Off" symbols, the transmitting device may use its receiver to detect for a simultaneous transmission by performing a CCA procedure as defined in IEEE Standards 802.11-2016, or by performing other energy detection schemes. For example, the transmitting device may detect the energy received on the channel for a specified duration, wherein such energy detection can be performed by processing the received signal in the time domain (or frequency domain). For another example, the transmitting device may detect the energy received on selected subcarriers where signal energy is placed when an "On" symbol is being transmitted, such as the subcarriers corresponding to the center 5 MHz frequency band of a 20 MHz channel as described before. To perform energy detection on the selected subcarriers, the transmitting device needs to process the received signal in the frequency domain (e.g., by performing a fast Fourier transform (FFT) on the received signal) in order to determine the energy received on the selected subcarriers, which doesn't increase the complexity of the transmitting device by much because an OFDM-based RCM (such as RCM 307 in FIG. 3) of the transmitting device is already capable of processing a received signal in the frequency domain.

In both the first and the second embodiments, the transmitting device may compare an energy level detected in step 2), as described above, with a pre-specified threshold to determine whether there is a simultaneous transmission by another device or not. The transmitting device may accumulate (e.g., by summing up, by averaging, etc.) the energy detected from multiple instances of the "Off" symbol or multiple instances of the two consecutive "Off" symbols (e.g., as shown and underlined in FIG. 7), which have occurred within the same wake-up packet, before comparing the accumulated energy detection result with the threshold. Accumulating the energy detected from multiple instances improves the detection reliability but incurs more delay before the transmitting device may make a determination of whether a simultaneous transmission by another device has been detected or not.

If a simultaneous transmission (i.e., a collision) is detected by the transmitting device, the transmitting device may attempt to mitigate the impact of such detected collision. For example, the transmitting may abort the transmission of a remaining portion of the wake-up packet immediately or as soon as possible so as to reduce interference to the collided signal. For another example, the transmitting device may consider the transmission of the current wake-up packet has failed and may initiate an attempt to re-transmit the wake-up packet (or to transmit another wake-up packet) to the same receiving device after winning a second channel contention after the channel becomes idle again, but without waiting for a lengthy time-out period to expire, as opposed to the cases shown in FIGS. 4A and 4B. In FIGS. 4A and 4B, a time-out period is defined as the period after transmitting the wake-up packet (shown as WUPs 424 and 474, respectively) and before realizing the wake-up packet has been lost, which consists of the wake-up latency period (shown as wake-up latencies 428 and 478 in FIGS. 4A and 4B, respectively), the channel contention time (shown as shaded blocks 430 and 480, respectively), the time duration for transmitting the data or RTS frame (shown as data 432 or RTS 482, respectively), and the time duration for receiving the anticipated ACK or CTS frame (shown as ACK 434 or CTS 484, respectively). Therefore, by enabling the transmitting device to initiate a re-transmission of the wake-up packet as soon as the channel becomes idle again, the delay penalty due to a loss of the wake-up packet (caused by the collision) is significantly reduced.

In some cases, the interfering device (i.e., the device transmitting the simultaneous transmission) may be a hidden node of the receiving device, i.e., the simultaneous transmission made by the interfering device may be detectable by the transmitting device, but not by the receiving device. In this situation, the wake-up packet might be able to be received by the receiving device just fine. Therefore, aborting the on-going transmission of the wake-up packet by the transmitting device, as described above, may not always be the correct action to take. To address this situation, first, the transmitting device may determine a distance between the transmitting device and the receiving device. Because WUR technology is mostly targeted for sensors, machines, and wearable devices, a distance between the transmitting device and the receiving device may be fixed and known to the transmitting device once the distance is measured, where the distance may be expressed as a physical distance between the two devices or a signal path-loss between the two devices. Then, in one embodiment, which is referred to as a selective mitigation method, the transmitting device may determine if the distance is too far or too short (or the path-loss is too large or too small) in order to selectively execute the example mitigation schemes as describe above. For example, if the distance is too far (or the path-loss is too large) when compared to a first distance threshold, the transmitting device considers the interfering signal is harmless to the receiving device and continues transmitting the remainder of the wake-up packet. On the other hand, if the distance is too short (or the path-loss is too small) when compared to a second distance threshold, the transmitting device considers the interfering signal harmful thus abandons and/or defers the transmission of the wake-up packet.

In an alternative embodiment, which is referred to as a soft detection method, the threshold that the transmitting device uses for comparing with the detected energy (in determining a collision) may be computed as a function of the distance between the two devices (the transmitting device and the receiving device, for example). For example, the function produces a high threshold value when the distance is far (or the path-loss is high) and produces a low threshold vale when the distance is short (or the path-loss is small), which means only strong interfering signals (as detected by the transmitting device) may be considered as harmful (to the receiving device) when the distance between the two devices is far, while a less strong interfering signal (as detected by the transmitting device) might be harmful to the receiving device when the distance between the two devices is short.

Figure 8:
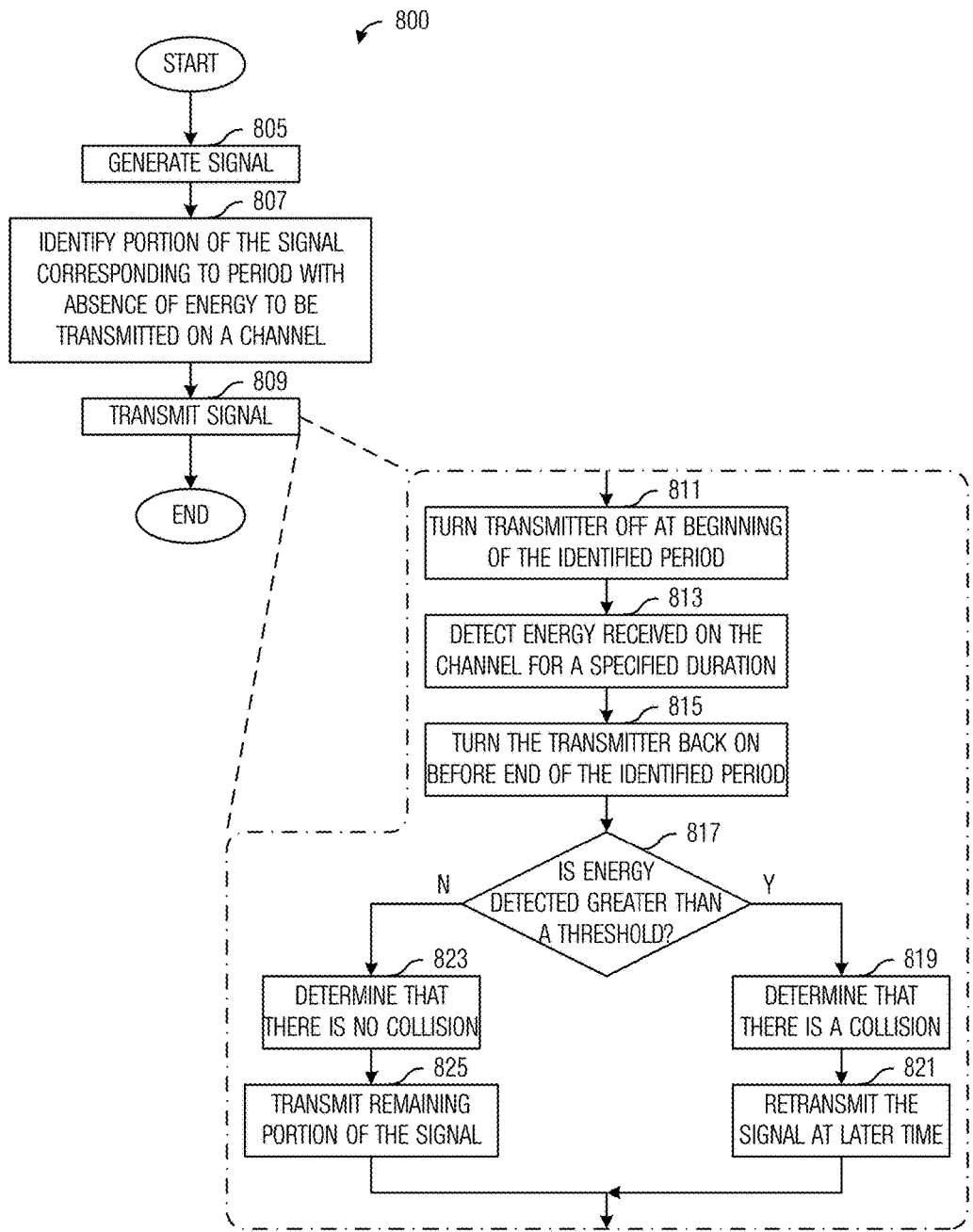
FIG. 8 illustrates a flow diagram of first example operations occurring in a transmitting device supporting the detecting of a collision and mitigating impact of detected collision according to example embodiments described herein.

FIG. 8 illustrates a flow diagram of first example operations 800 occurring in a transmitting device supporting the detecting of a collision and mitigating impact of detected collision according to example embodiments described herein. Operations 800 may be indicative of operations occurring in a transmitting device as the transmitting device supports the detection of a collision and the mitigation of the impact of the collision.

Operations 800 begin with the transmitting device generating a signal (block 805). The signal generated by the transmitting device may be a wake-up packet, an encoded wake-up packet, or a sequence of OOK symbols corresponding to the wake-up packet or the encoded wake-up packet. Alternatively, the signal may be any other type of packet, an encoded any other type of packet, or a sequence of OOK symbols corresponding to the any other type of packet or the encoded any other type of packet. The transmitting device identifies a portion of the signal corresponding to a period or periods during which time the transmitting device doesn't need to transmit energy on a shared channel (i.e., during which time the signal can be represented by an absence of energy being transmitted on the shared channel by the transmitting device), wherein the period or each of the periods has a duration meeting the duration requirement (for completing the steps of turning off the transmitter, turning on the receiver and detecting for a simultaneous transmission, and turning the receiver off and turning the transmitter back on), as described before (block 807).

In a situation wherein the signal is a wake-up packet or any other type of packet, the period may correspond to a sequence of one or more bit values equal to a "0", "1", "01", or "10" (whichever value that maps to a period during which the transmitting device doesn't need to transmit energy on the shared channel and a duration of the period meets the duration requirement as described before). In a situation wherein the signal is an encoded wake-up packet or an encoded any other type of packet, the period may correspond to a sequence of one or more encoded bits equal to a "0", "1", "00", or "11" (whichever value that maps to a period during which the transmitting device doesn't need to transmit energy on the shared channel and a duration of the meets the duration requirement as described before). In a situation wherein the signal is a sequence of OOK symbols corresponding to an wake-up packet, any other type of packet, an encoded wake-up packet, or an encoded any other type of packet, the period may correspond to a sequence of one or more consecutive "Off" OOK symbols, each of the one or more consecutive "Off" OOK symbols map to a period during which the transmitting device doesn't need to transmit energy on the shared channel and a duration of the period meets the duration requirement as described before).

The transmitting device transmits the signal (block 809). For example, the transmitting device transmits portions of the signal not corresponding to the portion of the signal identified by the pattern searcher. While transmitting the signal, at the beginning of the identified period, the transmitting device turns off the transmitter (block 811). The transmitting device detects energy received on the channel for a specified duration (block 813). The transmitting device may detect the energy received on the channel by turning on the receiver. The specified duration may be a subset of the identified period. As an illustrative example, the specified duration is typically less than or equal to a duration of the identified period minus a first amount of time required to turn off the transmitter and a second amount of time required to turn on the transmitter. The transmitting device turns the transmitter back on (block 815). The transmitting device turns the receiver off and turns the transmitter back on prior to the end of the identified period to ensure that the transmitter is ready to transmit by the end of the identified period, for example.

In a situation where there are multiple identified periods, the transmitting device may repeat blocks 811, 813, and 815 for each of the identified periods while transmitting the portions of the signal not corresponding to the identified periods. The transmitting device may accumulate (e.g., by summing up or averaging) the detected energies associated with each of the identified periods. Accumulating or averaging the energy detected from multiple instances improves the detection reliability but incurs more delay before the transmitting device may make a determination of whether a simultaneous transmission by another device has been detected or not. Therefore, the transmitting device may determine a maximal number of identified periods needed for the collision detection based on a detection reliability desired.

The transmitting device performs a check to determine if the detected energy (or energies) is greater than a threshold (block 817). The threshold, e.g., a collision threshold, may be specified by an operator of the communications system, determined based on historical information, determined collaboratively by the transmitting device and the receiving device, and so on. The transmitting device may make use of any of the detection methods described previously (e.g., soft detection or selective mitigation) to determine if the detected energy (or energies) is greater than a threshold. Additionally, the transmitting device may make use of distance and/or pathloss (between the transmitting device and a receiving device, wherein the receiving device is an intended recipient of the signal) in determining if the detected energy (or energies) is greater than a threshold. For example, the threshold may be generated as a function of the distance and/or pathloss. If the detected energy is greater than the threshold, then the transmitting device determines that a collision has occurred (block 819). The transmitting device may immediately stop the transmission of the signal and attempt to retransmit the signal after the channel becomes idle again (block 821). If the detected energy is not greater than the threshold, then the transmitting device determines that a collision has not occurred (block 823) and the transmitting device continues to complete the transmission of the signal (block 825). It is noted that even if the transmitting device determines that a collision has not occurred, a collision may still occur at a later time and the AP may return to block 807 to continue collision detection for the remainder of the signal.

The check to determine if the detected energy (or energies) is greater than a threshold (block 817) and related operations by the transmitting device (blocks 819-825) may occur as part of the transmission of the signal, as shown in FIG. 8. In an alternative example embodiment, in a situation where there is a plurality of identified periods, after a specified or predetermined number of identified periods (and the transmitting device has been able to accumulate the number of detected energies), the transmitting device may perform the check to determine if the accumulated detected energy is greater than a threshold (block 817) and perform related operations (blocks 819-825).

Figure 9:
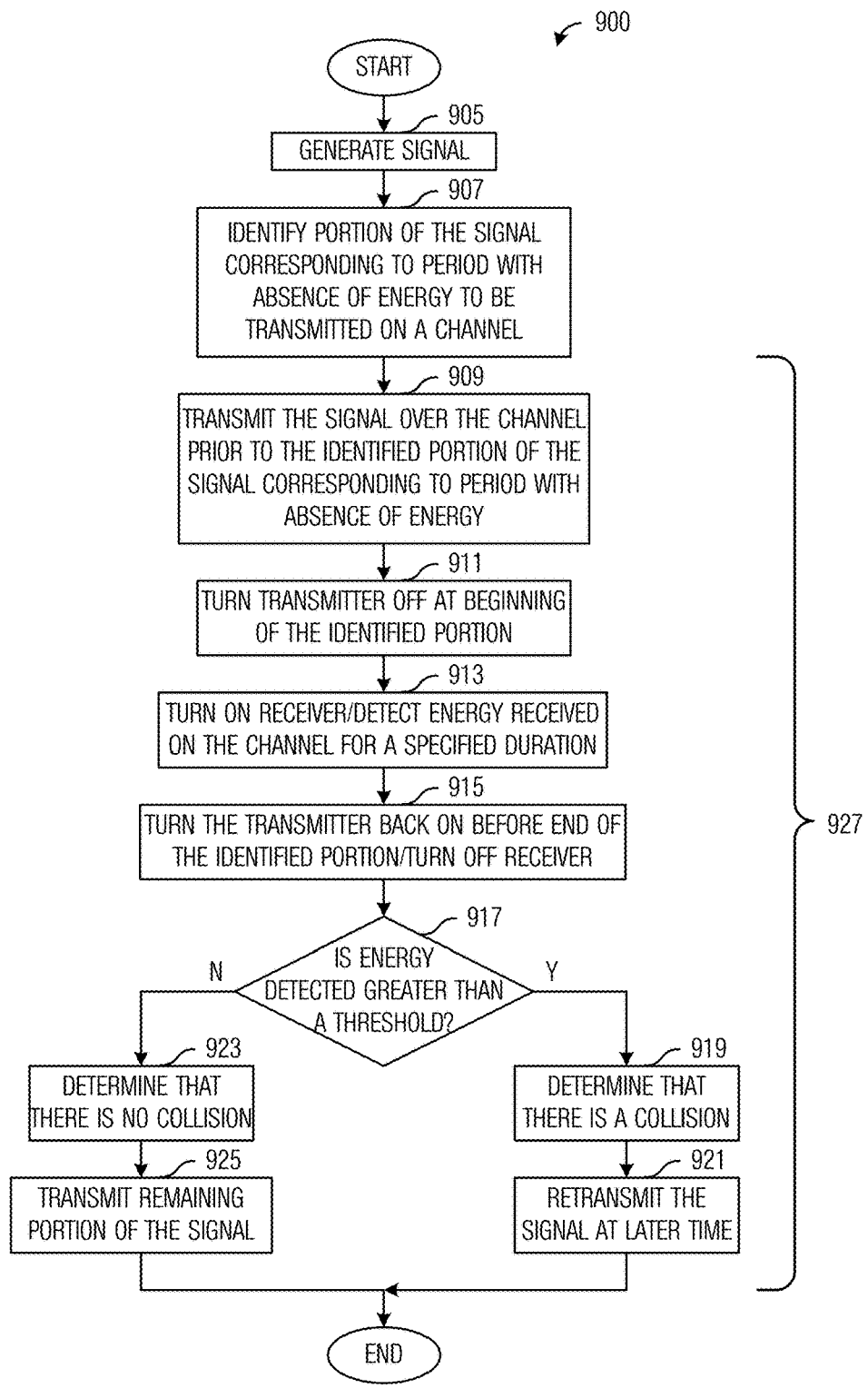
FIG. 9 illustrates a flow diagram of second example operations occurring in a transmitting device supporting the detecting of a collision and mitigating impact of detected collision according to example embodiments described herein.

FIG. 9 illustrates a flow diagram of second example operations 900 occurring in a transmitting device supporting the detecting of a collision and mitigating impact of detected collision according to example embodiments described herein. Operations 900 may be indicative of operations occurring in a transmitting device as the transmitting device supports the detection of a collision and the mitigation of the impact of the collision.

Operations 900 begin with the transmitting device generating a signal (block 905). The signal generated by the transmitting device may be a wake-up packet, an encoded wake-up packet, or a sequence of OOK symbols corresponding to the wake-up packet or the encoded wake-up packet. Alternatively, the signal may be any other type of packet, an encoded any other type of packet, or a sequence of OOK symbols corresponding to the any other type of packet or the encoded any other type of packet. The transmitting device identifies a portion of the signal corresponding to a period or periods during which time the transmitting device doesn't need to transmit energy on a shared channel, wherein the period or each of the periods has a duration meeting the duration requirement as described before (block 907).

The transmitting device transmits the signal over the shared channel prior to the identified portion (block 909). In other words, the transmitting device transmits a portion of the signal that has not been identified as the portion that corresponds to a period or periods during which time the transmitting device doesn't need to transmit energy on the shared channel.

The transmitting device turns off its transmitter at a time corresponding to a beginning of the identified portion (block 911). The transmitting device turns on its receiver and detects energy received on the shared channel for a specified duration (block 913). The specified duration corresponds to a duration of the period during which time the transmitting device doesn't need to transmit energy on the shared channel minus switching time for the transmitter to turn off and on and for the receiver to turn on and off, where the switching time may include a warm up time for the oscillators to stabilize, and so forth. The transmitting device turns the transmitter back on before the end of the identified portion (block 915). The transmitting device may turn the transmitter back on at a time sufficiently before the end of the identified portion to allow for the transmitter to be stable when the end of the identified portion is reached. The transmitter may also turn off the receiver at any time before the end of the identified portion.

The transmitting device performs a check to determine if the detected energy (or energies) is greater than a threshold (block 917). The threshold, e.g., a collision threshold, may be specified by an operator of the communications system, determined based on historical information, determined collaboratively by the transmitting device and the receiving device, and so on. The transmitting device may make use of any of the detection methods described previously (e.g., soft detection or selective mitigation) to determine if the detected energy (or energies) is greater than a threshold. Additionally, the transmitting device may make use of distance and/or pathloss (between the transmitting device and a receiving device, wherein the receiving device is an intended recipient of the signal) in determining if the detected energy (or energies) is greater than a threshold. For example, the threshold may be generated as a function of the distance and/or pathloss. If the detected energy is greater than the threshold, then the transmitting device determines that a collision has occurred (block 919). The transmitting device may immediately stop the transmission of the signal and attempt to retransmit the signal after the channel becomes idle again (block 921). If the detected energy is not greater than the threshold, then the transmitting device determines that a collision has not occurred (block 923) and the transmitting device continues to complete the transmission of the signal (block 925). It is noted that even if the transmitting device determines that a collision has not occurred, a collision may still occur at a later time and the AP may return to block 907 to continue collision detection for the remainder of the signal.

Blocks 909-925 may be referred to collectively as transmitting the signal (blocks 927). In an alternative example embodiment, in a situation where there is a plurality of identified periods, after a specified or predetermined number of identified periods (and the transmitting device has been able to accumulate the number of detected energies), the transmitting device may perform the check to determine if the accumulated detected energy is greater than a threshold (block 917) and perform related operations (blocks 919-925).

Figure 10:
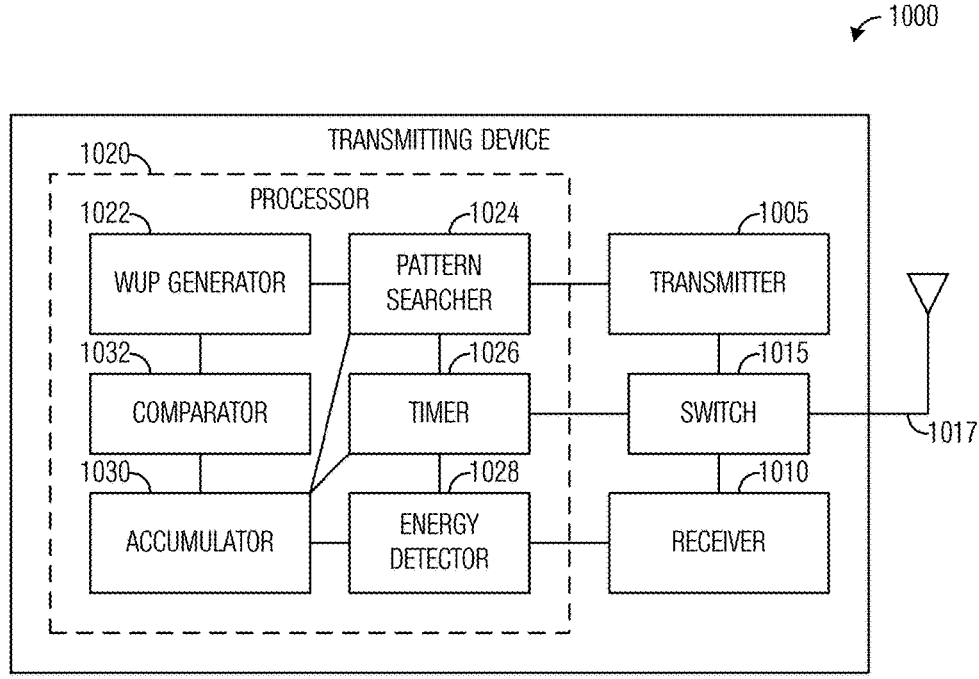
FIG. 10 illustrates functional blocks of an example transmitting device according to example embodiments described herein.

FIG. 10 illustrates functional blocks of an example transmitting device 1000. Transmitting device 1000 is configured to implement the collision and mitigation techniques disclosed herein. Examples of transmitting device 1000 include an AP attempting to wake up a sleeping STA, a STA attempting to wake up a sleeping AP, a STA operating in the P2P communications mode and attempting to wake up a peer STA that is sleeping, and a communications station attempting to transmit any other type of OOK modulated signal. Transmitting device 1000 includes a transmitter 1005 configured to, among others things, transmit OOK symbols on a channel in the form of the presence or absence of energy being transmitted on the channel and a receiver 1010 configured to, among other things, detect energy received on the channel. A switch 1015 allows transmitter 1005 or receiver 1010 to be alternately coupled to one or more shared antennas 1017.

Transmitting device 1000 also includes one or more processors 1020. Processor 1020 includes a WUP generator 1022 configured to generate a wake-up packet or any other packet. Processor 1020 also includes a pattern searcher 1024 configured to search any one of a variety of forms of the wake-up packet or any other packet (such as un-encoded data bits, encoded bits, or OOK symbols) for a specific pattern or patterns that corresponds to a period or periods, during which time the transmitting device doesn't need to transmit energy on the channel and a duration of which period or each of which periods meets a duration requirement, wherein a duration meeting the duration requirement allows sufficient time for turning transmitter 1005 off, turning receiver 1010 on and detecting for a simultaneous transmission, turning receiver 1010 off and turning transmitter 1005 back on to get ready for transmitting the next "On" symbol. Processor 1020 also includes a timer 1026 configured to measure elapsed time corresponding to a period that corresponds to the specific pattern, which corresponds to the absence of energy to be transmitted on the channel for a duration meeting the duration requirement. Switch 1015 may make use of the elapsed time measured by timer 1026 to determine when to switch transmitter 1005 on or off antenna 1017 and when to switch receiver 1010 on or off antenna 1017.

Processor 1020 further includes an energy detector 1020 configured to measure energy on the channel, and an accumulator 1030 configured to accumulate energy detected by energy detector 1028 in situations wherein there are multiple periods corresponding to the specific pattern. Energy detector 1028 may make use of the elapsed time measured by timer 1026 to determine when to start or end energy detection. The accumulator 1030 may make use of the elapsed time measured by timer 1026 or the pattern detected by pattern searcher 1024 to determine when to accumulate energy detected by energy detector 1028. Processor 1020 further include a comparator 1032 configured to compare the detected energy or accumulated (or averaged) detected energy with a threshold to determine if a collision has occurred. Comparator 1032 may make use of any of the detection methods described previously (e.g., soft detection or selective mitigation) to determine if the detected energy (or energies) is greater than a threshold. Additionally, comparator 1032 may make use of distance and/or pathloss in the determination if the detected energy (or energies) is greater than a threshold. WUP generator 1022 may make use of the determination from comparator 1032 to determine whether to generate the wake-up packet or the any other packet again for making another attempt of transmitting the wake-up packet or the any other packet after the channel becomes idle again.

In addition to wake-up packet, the techniques disclosed herein can also be used for enabling a transmitting device to detect collision with other types of OOK modulated signal being transmitted before the transmitting device finishes transmitting the signal, so that the transmitter may decide to 1) abandon the current transmission so as to reduce interference to others; 2) re-transmit the signal soon after the channel becomes idle again without waiting for a lengthy time-out period to expire so as to reduce the delay penalty when losing the signal in the first transmission. One example of such other types of OOK modulated signal is a WUR Beacon transmitted by the transmitting device. A WUR Beacon is an OOK modulated signal with the same narrow signal bandwidth and format as a wake-up packet, such as wake-up packet 325 illustrated in FIG. 3. A WUR Beacon is not used for waking up a sleeping receiving device. Instead, a WUR Beacon is transmitted periodically by a transmitted device, carrying current clock information of a clock of the transmitting device, and is used by a receiving device for maintaining time synchronization between a clock of the receiving device and the clock of the transmitting device. An example of a clock information of the transmitting device is a timestamp, which is also known as the time synchronization function (TSF). The IEEE Standard 802.11-2016 defines a TSF as a 64-bit timer, incremented every 1 microsecond. Maintaining the time synchronization enables the WUR receiver of the receiving device to operate in a duty-cycled mode to further reduce its power consumption.

However, such synchronization mechanism may subject to malicious attacks when the attacker spoofs a WUR Beacon transmitted by a legitimate transmitting device and then replays the spoofed WUR Beacon at a later time when the clock information becomes obsolete, causing a receiving device (which is the victim device) to update its local clock with a wrong clock information thereby becoming unsynchronized with the transmitted device and unable to be waken up by the transmitted device. For detecting such a replayed WUR Beacon, every WUR Beacon may contain a counter value (a sequence number), which the transmitting device increments for ever new WUR Beacon and the receiving device keeps tracking. However, to defeat such a replay detection mechanism, the attacker may attempt to block the reception of the legitimate WUR Beacon by the victim device, so that the victim device will still look for the same counter value as in the spoofed and replayed WUR Beacon. As an example, blocking the reception of the legitimate WUR Beacon can be achieved by the attacker injecting interference onto the channel while the transmitting device is transmitting the legitimate WUR Beacon. A conventional transmitting device would not be able to detect such blocking attempts by itself while transmitting the WUR Beacon. However, the techniques discussed herein can be used by the transmitting device to detect whether there is a collision with a WUR Beacon being transmitted, and when detecting such a collision, to immediately schedule a transmission of another WUR Beacon (with an updated clock information of the transmitted device). If the transmitting device detects that collisions persist during the transmission(s) of subsequent replacement WUR Beacon(s), the transmitting device may determine that it has detected attempts, performed by the attacker, of blocking the reception of legitimate WUR Beacons by the victim device (i.e., attempts of preventing the victim device from correctly receiving the legitimate WUR Beacons). Based thereon, the transmitting device may determine that it has detected a malicious attack on the time synchronization between the transmitted device and the receiving devices served by the transmitted device.

Figure 11:
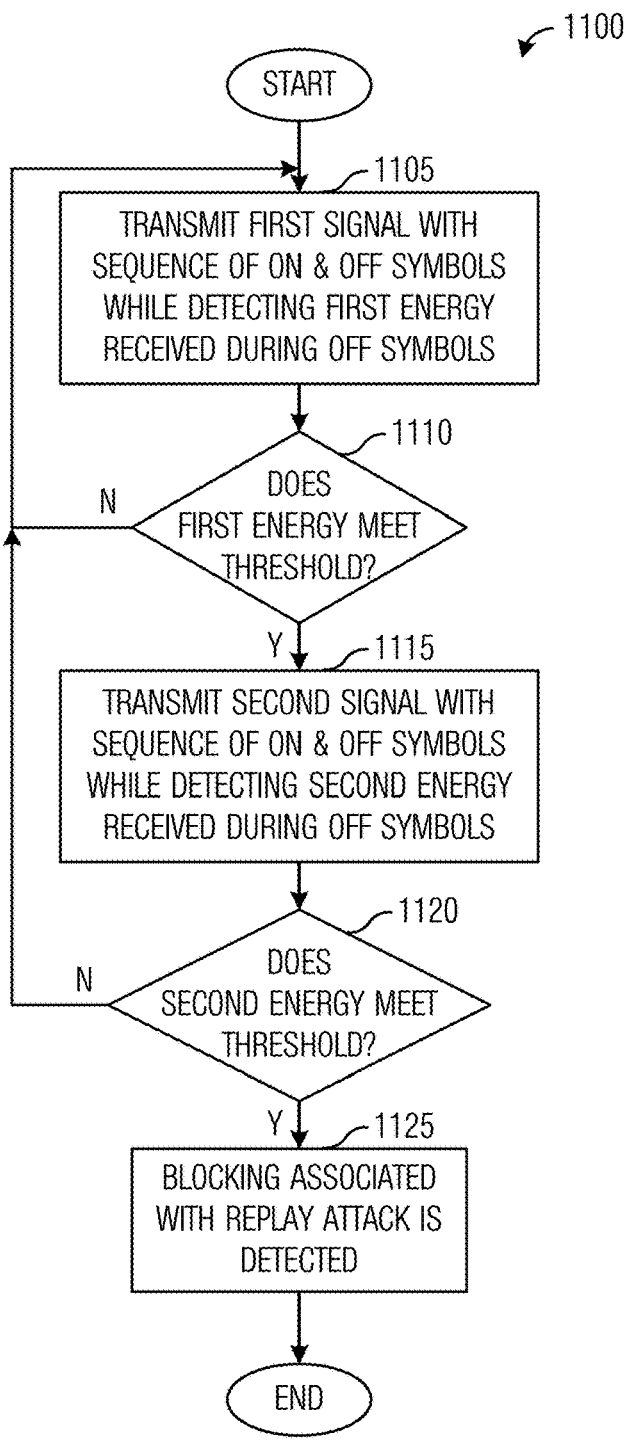
FIG. 11 illustrates a flow diagram of example operations occurring in a transmitting device supporting the detecting of a malicious interference associated with a replay attack according to example embodiments described herein.

FIG. 11 illustrates a flow diagram of example operations 1100 occurring in a transmitting device supporting the detecting of a malicious interference associated with a replay attack according to example embodiments described herein. Operations 1100 may be indicative of operations occurring in a transmitting device as the transmitting device supports the detection of a malicious interference associated with a replay attack.

Operations 1100 begin with the transmitting device transmitting a first signal comprising a first sequence of on symbols and off symbols, while detecting a first energy received on a channel during one or more off symbols of the first sequence (block 1105). Each on symbol of the first sequence is represented with energy being transmitted onto the channel and each off symbol of the first sequence is represented with a lack of energy being transmitted onto the channel. For example, each on symbol may be an OOK-modulated on symbol and each off symbol may be an OOK-modulated off symbol. An example of the first signal may be a WUR Beacon carrying clock information of a clock of the transmitting device and used for maintaining time synchronization between a clock of a receiving device and the clock of the transmitting device. The first energy may be detected during one or more time periods of consecutive off symbols of the first sequence, during which time the transmitting device is not transmitting energy onto the channel, wherein a duration of each of the time periods meets the duration requirement as described previously.

The transmitting device determines whether the detected first energy meets a collision threshold (i.e., is greater than the collision threshold) or not (block 1110). For example, the collision threshold may be specified by an operator of the communications system, determined based on historical information or as a function of a distance (or path loss) between the transmitting device and the receiving device, or determined collaboratively by the transmitting device and the receiving device, as described previously. For another example, the collision threshold may be specified as an energy level that is a certain number of decibels (dB), such as 10 or 20 dB, higher than the background noise energy level that is measured by the transmitting device when the channel is idle. It is noted that other values for the energy level are possible. If the detected first energy doesn't meet the collision threshold, the transmitting device returns to block 1105 and continues to transmit a first signal periodically, possibly updating certain content in each subsequent first signal (such as the clock information in the WUR Beacon, for example). If the detected first energy meets the collision threshold, the transmitting device transmits a second signal comprising a second sequence of on symbols and off symbols, while detecting a second energy received on the channel during one or more off symbols of the second sequence (block 1115). Each on symbol of the second sequence is represented with energy being transmitted onto the channel and each off symbol of the second sequence is represented with a lack of energy being transmitted onto the channel. The second signal may be a copy of the first signal or a replacement signal of the first signal possibly with certain updated content (such as the clock information in the WUR Beacon, for example). The second energy may be detected during one or more time periods of consecutive off symbols of the second sequence, during which time the transmitting device is not transmitting energy onto the channel, wherein a duration of each of the time periods meets the duration requirement as described previously.

The transmitting device determines whether the detected second energy meets the collision threshold (i.e., is greater than the collision threshold) or not (block 1120). The collision threshold used for the detected second energy may be the same or different from the collision threshold used for the detected first energy. If the detected second energy doesn't meet the collision threshold, the transmitting device returns to block 1105 and continues to transmit a first signal periodically, possibly updating certain content in each subsequent first signal (such as the clock information in the WUR Beacon, for example). If the detected second energy meets the collision threshold, the transmitting device determines that an attempt of blocking (legitimate signals) associated with a replay attack is detected (block 1125). For example, the replay attack may be an attack to compromise the time synchronization between the transmitted device and a receiving device served by the transmitted device by first blocking the legitimate WUR Beacons (the first and second signals) and then replaying the spoofed WUR Beacons at wrong times, as described previously.

When a malicious attack on the time synchronization between the transmitted device and the receiving devices served by the transmitted device is detected, the transmitting device may decide to change the mode of WUR operation for the receiving devices to a secured mode, where operation doesn't rely on the WUR Beacon or time synchronization. For example, a secured mode may be an always-on mode wherein the WUR receiver of the receiving device is always on. For another example, a secured mode may be an asynchronous duty-cycled mode. Co-assigned U.S. patent application Ser. No. 15/843,484, filed on Dec. 15, 2017, entitled "SYSTEM AND METHOD FOR ASYNCHRONOUS WAKE-UP MODE AND RELATED MODE SWITCHING," which is incorporated herein by reference in its entirety, describes various example embodiments of techniques for ensuring that at least one wake-up packet is transmitted during an "On" period of a WUR receiver of a receiving device operating in the asynchronous duty-cycled mode, which is a duty-cycled mode that does not rely on the WUR Beacons to maintain clock synchronization between the transmitting device and the receiving device.

An example embodiment of a technique for ensuring that at least one wake-up packet is transmitted during an "On"

period of a WUR receiver of a receiving device involves a transmitting device scheduling the transmission of a sequence of wake-up packets, where the wake-up packets are spaced sufficiently close to one another to cover sufficient number of testing spots within a duty cycle (or equivalently so) and the sequence is sufficiently long to ensure that at least one wake-up packet in the sequence of wake-up packets is transmitted during an "On" period of the WUR receiver of the receiving device.

Figure 12:
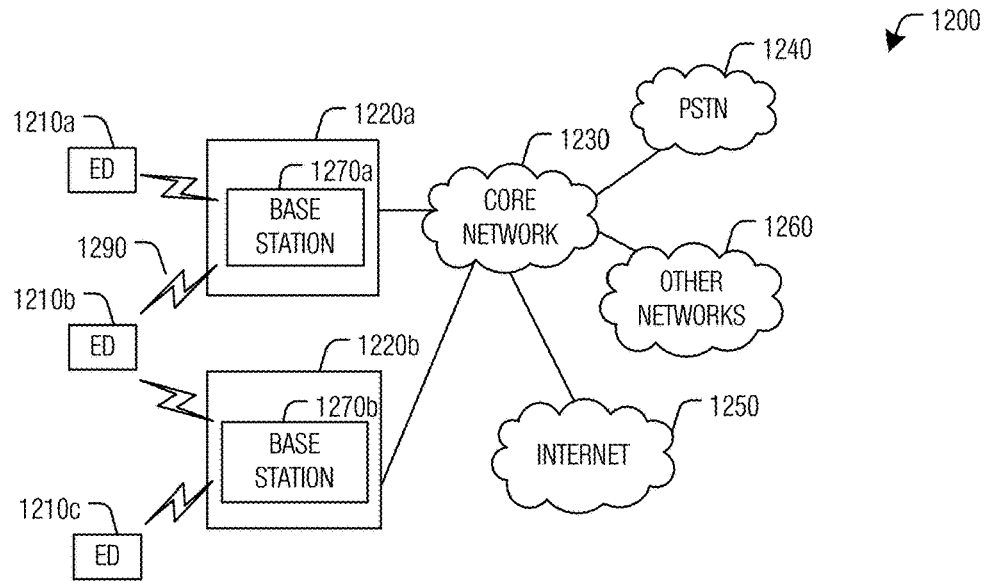
FIG. 12 illustrates an example communication system according to example embodiments described herein.

FIG. 12 illustrates an example communication system 1200. In general, the system 1200 enables multiple wireless or wired users to transmit and receive data and other content. The system 1200 may implement one or more channel access methods, such as code division multiple access (CDMA), time division multiple access (TDMA), frequency division multiple access (FDMA), orthogonal FDVIA (OFDMA), or single-carrier FDVIA (SC-FDMA).

In this example, the communication system 1200 includes electronic devices (ED) 1210a-1210c, radio access networks (RANs) 1220a-1220b, a core network 1230, a public switched telephone network (PSTN) 1240, the Internet 1250, and other networks 1260. Stations and WUR-capable stations are examples of EDs, and wireless local area networks (WLANs) are examples of RANs. While certain numbers of these components or elements are shown in FIG. 12, any number of these components or elements may be included in the system 1200.

The EDs 1210a-1210c are configured to operate and/or communicate in the system 1200. For example, the EDs 1210a-1210c are configured to transmit and/or receive via wireless or wired communication channels. Each ED 1210a-1210c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1220a-1220b here include base stations 1270a-1270b, respectively. APs are examples of base stations. Each base station 1270a-1270b is configured to wirelessly interface with one or more of the EDs 1210a-1210c to enable access to the core network 1230, the PSTN 1240, the Internet 1250, and/or the other networks 1260. For example, the base stations 1270a-1270b may include (or be) one or more of several well-known devices, such as a base transceiver station (BTS), a Node-B (NodeB), an evolved NodeB (eNodeB), a Home NodeB, a Home eNodeB, a site controller, an AP, or a wireless router. The EDs 1210a-1210c are configured to interface and communicate with the Internet 1250 and may access the core network 1230, the PSTN 1240, and/or the other networks 1260.

In the embodiment shown in FIG. 12, the base station 1270a forms part of the RAN 1220a, which may include other base stations, elements, and/or devices. Also, the base station 1270b forms part of the RAN 1220b, which may include other base stations, elements, and/or devices. Each base station 1270a-1270b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1270a-1270b communicate with one or more of the EDs 1210a-1210c over one or more air interfaces 1290 using wireless communication links. The air interfaces 1290 may utilize any suitable radio access technology.

It is contemplated that the system 1200 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 1220a-1220b are in communication with the core network 1230 to provide the EDs 1210a-1210c with voice, data, application, Voice over Internet Protocol (VoIP), or other services. Understandably, the RANs 1220a-1220b and/or the core network 1230 may be in direct or indirect communication with one or more other RANs (not shown). The core network 1230 may also serve as a gateway access for other networks (such as the PSTN 1240, the Internet 1250, and the other networks 1260). In addition, some or all of the EDs 1210a-1210c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1250.

Although FIG. 12 illustrates one example of a communication system, various changes may be made to FIG. 12. For example, the communication system 1200 could include any number of EDs, base stations, networks, or other components in any suitable configuration.

Figure 13A:
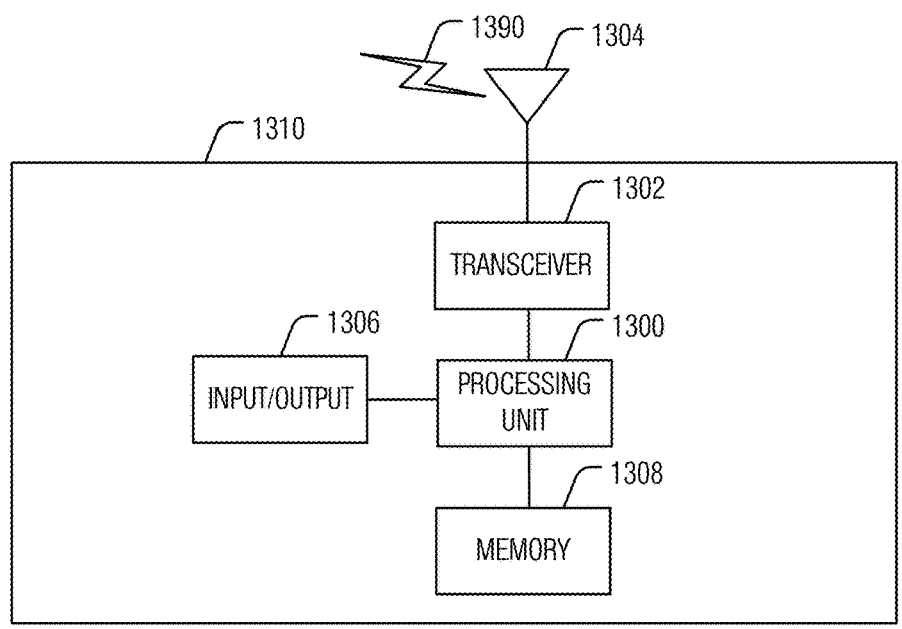
FIGS. 13A and 13B illustrate example devices that may implement the methods and teachings according to this disclosure.
Figure 13B:
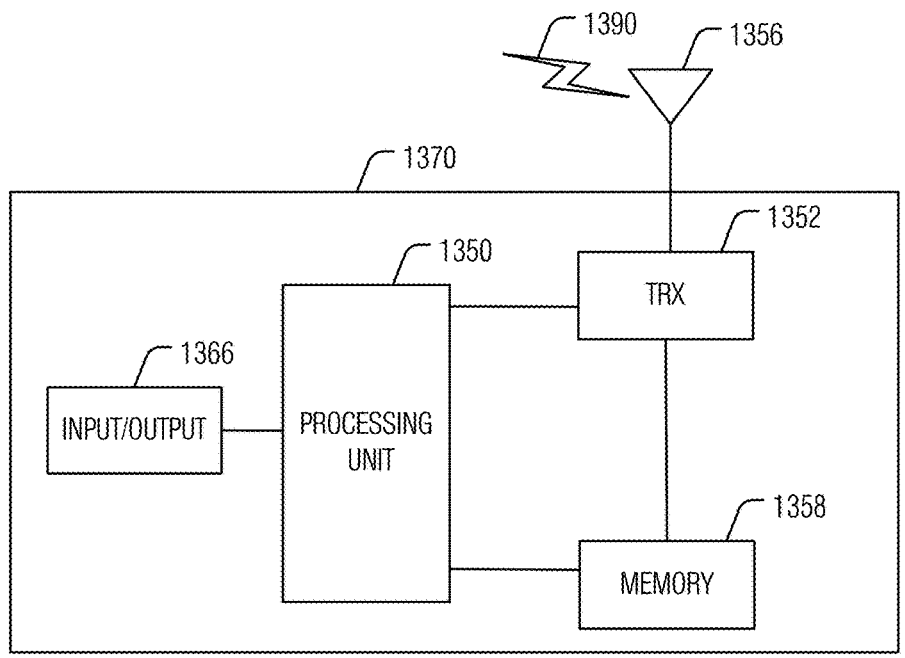

FIGS. 13A and 13B illustrate example devices that may implement the methods and teachings according to this disclosure. In particular, FIG. 13A illustrates an example ED 1310, and FIG. 13B illustrates an example base station 1370. These components could be used in the system 1200 or in any other suitable system.

As shown in FIG. 13A, the ED 1310 includes at least one processing unit 1300. The processing unit 1300 implements various processing operations of the ED 1310. For example, the processing unit 1300 could perform signal coding, data processing, power control, input/output processing, or any other functionality enabling the ED 1310 to operate in the system 1200. The processing unit 1300 also supports the methods and teachings described in more detail above. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1310 also includes at least one transceiver 1302. The transceiver 1302 is configured to modulate data or other content for transmission by at least one antenna or NIC (Network Interface Controller) 1304. The transceiver 1302 is also configured to demodulate data or other content received by the at least one antenna 1304. One of the transceivers 1302 is configured to operate as a LP-WUR receiver (i.e., it is configured to receive a wake-up packet addressed to ED 1310 and to wake up another of the transceivers 1302 upon receiving the wake-up packet). Each transceiver 1302 includes any suitable structure for generating signals for wireless or wired transmission and/or processing signals received wirelessly or by wire. Each antenna 1304 includes any suitable structure for transmitting and/or receiving wireless or wired signals. One or multiple transceivers 1302 could be used in the ED 1310, and one or multiple antennas 1304 could be used in the ED 1310. Although shown as a single functional unit, a transceiver 1302 could also be implemented using at least one transceiver and at least one separate receiver, wherein the at least one transceiver and the at least one separate receiver are capable of being separately powered on or off in order to facilitating power saving in accordance with various embodiments described herein. Although shown as a single functional unit, a processing unit 1300 could also be implemented using at least one processing unit associated with the at least one transceiver and at least one separate processing unit associated with the at least one separate receiver, wherein the at least one processing unit and the at least one separate processing unit are capable of being separately powered on or off in order to facilitating power saving in accordance with various embodiments described herein.

The ED 1310 further includes one or more input/output devices 1306 or interfaces (such as a wired interface to the Internet 1250). The input/output devices 1306 facilitate interaction with a user or other devices (network communications) in the network. Each input/output device 1306 includes any suitable structure for providing information to or receiving/providing information from a user, such as a speaker, microphone, keypad, keyboard, display, or touch screen, including network interface communications.

In addition, the ED 1310 includes at least one memory 1308. The memory 1308 stores instructions and data used, generated, or collected by the ED 1310. For example, the memory 1308 could store software or firmware instructions executed by the processing unit(s) 1300 and data used to reduce or eliminate interference in incoming signals. Each memory 1308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. Although shown as a single functional unit, a memory 1308 could also be implemented using at least one memory associated with the at least one transceiver and at least one separate memory associated with the at least one separate receiver, wherein the at least one memory and the at least one separate memory are capable of being separately powered on or off in order to facilitating power saving in accordance with various embodiments described herein As shown in FIG. 13B, the base station 1370 includes at least one processing unit 1350, at least one transceiver 1352, which includes functionality for a transmitter and a receiver, one or more antennas 1356, at least one memory 1358, and one or more input/output devices or interfaces 1366. A scheduler, which would be understood by one skilled in the art, is coupled to the processing unit 1350. The scheduler could be included within or operated separately from the base station 1370. The processing unit 1350 implements various processing operations of the base station 1370, such as signal coding, data processing, power control, input/output processing, or any other functionality. The processing unit 1350 can also support the methods and teachings described in more detail above. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transceiver 1352 includes any suitable structure for generating signals for wireless or wired transmission to one or more EDs or other devices. Each transceiver 1352 further includes any suitable structure for processing signals received wirelessly or by wire from one or more EDs or other devices. Although shown combined as a transceiver 1352, a transmitter and a receiver could be separate components. Each antenna 1356 includes any suitable structure for transmitting and/or receiving wireless or wired signals. While a common antenna 1356 is shown here as being coupled to the transceiver 1352, one or more antennas 1356 could be coupled to the transceiver(s) 1352, allowing separate antennas 1356 to be coupled to the transmitter and the receiver if equipped as separate components. Each memory 1358 includes any suitable volatile and/or non-volatile storage and retrieval device(s). Each input/output device 1366 facilitates interaction with a user or other devices (network communications) in the network. Each input/output device 1366 includes any suitable structure for providing information to or receiving/providing information from a user, including network interface communications.

Figure 14:
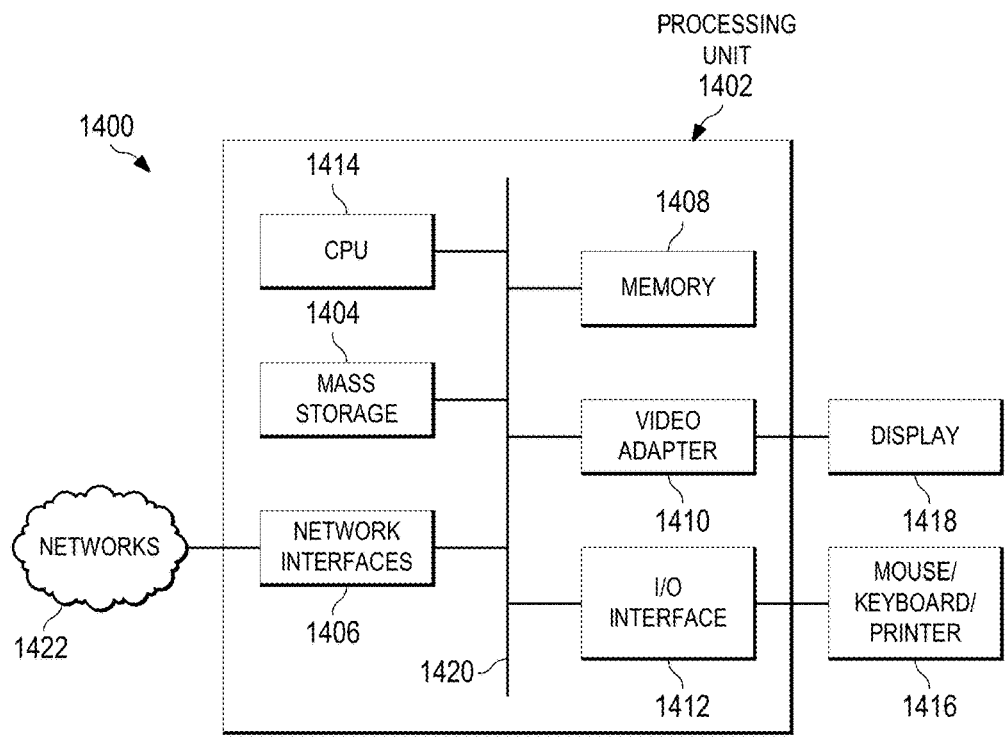
FIG. 14 is a block diagram of a computing system that may be used for implementing the devices and methods disclosed herein.

FIG. 14 is a block diagram of a computing system 1400 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit includes a central processing unit (CPU) 1414, memory 1408, and may further include a mass storage device 1404, a video adapter 1410, and an I/O interface 1412 connected to a bus 1420.

The bus 1420 may be one or more of any type of several bus architectures including a memory bus or memory controller, a peripheral bus, or a video bus. The CPU 1414 may comprise any type of electronic data processor. The memory 1408 may comprise any type of non-transitory system memory such as static random access memory (SRAM), dynamic random access memory (DRAM), synchronous DRAM (SDRAM), read-only memory (ROM), or a combination thereof. In an embodiment, the memory 1408 may include ROM for use at boot-up, and DRAM for program and data storage for use while executing programs.

The mass storage 1404 may comprise any type of non-transitory storage device configured to store data, programs, and other information and to make the data, programs, and other information accessible via the bus 1420. The mass storage 1404 may comprise, for example, one or more of a solid state drive, hard disk drive, a magnetic disk drive, or an optical disk drive.

The video adapter 1410 and the I/O interface 1412 provide interfaces to couple external input and output devices to the processing unit 1402. As illustrated, examples of input and output devices include a display 1418 coupled to the video adapter 1410 and a mouse/keyboard/printer 1416 coupled to the I/O interface 1412. Other devices may be coupled to the processing unit 1402, and additional or fewer interface cards may be utilized. For example, a serial interface such as Universal Serial Bus (USB) (not shown) may be used to provide an interface for an external device.

The processing unit 1402 also includes one or more network interfaces 1406, which may comprise wired links, such as an Ethernet cable, and/or wireless links to access nodes or different networks. The network interfaces 1406 allow the processing unit 1402 to communicate with remote units via the networks. For example, the network interfaces 1406 may provide wireless communication via one or more transmitters/transmit antennas and one or more receivers/receive antennas. In an embodiment, the processing unit

1402 is coupled to a local-area network 1422 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an identifying unit/module, a turning off unit/module, a turning on unit/module, a detecting unit/module, a determining unit/module, a stopping unit/module, and/or an obtaining unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for collision detection by a transmission device (TD), the method comprising:
    identifying, by the TD, one or more time periods of a signal generated by the TD, the one or more time periods corresponding to periods during which the TD will not transmit energy on a shared channel; and
    transmitting, by the TD, a subset of the signal, wherein while a current time is within one of the one or more time periods, transmitting the subset of the signal comprises:
        turning off, by the TD, a transmitter of the TD at a beginning of the time period,
        detecting, by the TD, energy received on the shared channel during a portion of the time period,
        turning on, by the TD, the transmitter of the TD before an end of the time period, and
        determining, by the TD, that the detected energy meets a collision threshold, and based thereon, determining that there is a transmission collision.

2. The method of claim 1, wherein the signal is an On-off-keying (OOK) modulated signal.

3. The method of claim 1, wherein the signal is used for waking up a communications station from a sleep mode.

4. The method of claim 1, wherein the signal is a wake-up radio beacon.

5. The method of claim 1, wherein the TD is an access point (AP).

6. The method of claim 1, further comprising stopping, by the TD, the transmitting the signal when the detected energy meets the collision threshold.

7. The method of claim 1, further comprising retransmitting, by the TD, the signal at a later time in response to determining that the detected energy meets the collision threshold.

8. The method of claim 1, wherein each time period corresponds to an information bit "0" immediately followed by an information bit "1".

9. The method of claim 1, wherein each time period corresponds to encoded bits "0 0", and wherein each encoded bit "0" of the encoded bits "0 0" is modulated as an "off" symbol, for which the TD does not transmit energy on the shared channel.

10. The method of claim 1, further comprising obtaining, by the TD, an information related to a distance between the TD and a receiving device (RD), wherein the RD is an intended recipient of the signal.

11. The method of claim 10, wherein the information related to the distance is one of a physical distance between the TD and the RD or a signal path-loss between the TD and the RD.

12. The method of claim 10, wherein the collision threshold is determined in accordance with a function of the information related to the distance.

13. The method of claim 10, wherein determining that there is a transmission collision further comprises determining, by the TD, that the information related to the distance is less than a distance threshold.

14. The method of claim 1, further comprising:
    turning on, by the TD, a receiver of the TD to perform the detecting after turning off the transmitter; and
    turning off, by the TD, the receiver before turning the transmitter back on.

15. The method of claim 14, wherein each of the one or more time periods is of sufficient duration allowing sufficient time for the TD to perform all of the following within the time period: turning off the transmitter, turning on the receiver, detecting energy received on the shared channel during a subset of the time period using the receiver, turning off the receiver, and turning on the transmitter.

16. The method of claim 1, further comprising averaging, by the TD, the energy detected during each time period, wherein determining the transmission collision is in accordance with the averaged detected energy and the collision threshold.

17. A transmitting device (TD) adapted to perform collision detection, the transmitting device comprising:
    one or more processors; and
    a computer readable storage medium storing programming for execution by the one or more processors, the programming including instructions to configure the transmitting device to:
        identify one or more time periods of a signal generated by the TD, the one or more time periods corresponding to periods during which the TD will not transmit energy on a shared channel, and
        transmit a subset of the signal, wherein while a current time is within one of the one or more time periods, transmitting the subset of the signal comprises:
            turn off a transmitter of the TD at a beginning of the time period,
            detect energy received on the shared channel during a portion of the time period,
            turn on the transmitter of the TD before an end of the time period, and
            determine that the detected energy meets a collision threshold, and based thereon, determine that there is a transmission collision.

18. The transmitting device of claim 17, wherein the one or more processors further execute the instructions to stop a transmission of the signal when the detected energy meets the collision threshold.

19. The transmitting device of claim 17, wherein the one or more processors further execute the instructions to retransmit the signal at a later time in response to determining that the detected energy meets the collision threshold.

20. The transmitting device of claim 17, wherein the one or more processors further execute the instructions to obtain an information related to a distance between the TD and a receiving device (RD), wherein the RD is an intended recipient of the signal.

21. The transmitting device of claim 20, wherein the one or more processors further execute the instructions to one of determine the collision threshold in accordance with a function of the information related to the distance or determine that the information related to the distance is less than a distance threshold.

22. The transmitting device of claim 17, wherein the one or more processors further execute the instructions to turn on a receiver of the TD to perform the detecting of the energy after turning off the transmitter, and turn off the receiver before turning the transmitter back on.

23. The transmitting device of claim 17, wherein the one or more processors further execute the instructions to average the energy detected during each time period, wherein the transmission collision is determined in accordance with the averaged detected energy and the collision threshold.

24. A method for collision detection by a transmission device (TD), the method comprising:
    identifying, by the TD, a time period of an On-off-keying (OOK) modulated signal generated by the TD, the time period corresponding to a period during which the TD will not transmit energy on a shared channel;
    transmitting, by the TD, the OOK modulated signal over the shared channel prior to the time period;
    turning off, by the TD, a transmitter of the TD at a beginning of the time period;
    detecting, by the TD, energy received on the shared channel during a portion of the time period; and
    determining, by the TD, that the detected energy meets a collision threshold, and based thereon, determining that the OOK modulated signal experienced a transmission collision.

25. The method of claim 24, further comprising stopping, by the TD, the transmitting the OOK modulated signal when the detected energy meets the collision threshold.

26. The method of claim 24, further comprising retransmitting, by the TD, the OOK modulated signal at a later time in response to determining that the detected energy meets the collision threshold.

27. The method of claim 24, further comprising turning on, by the TD, a receiver of the TD to perform the detecting after turning off the transmitter.

* * * * *